US010707627B2

(12) United States Patent
Nasiri Mahalati et al.

(10) Patent No.: US 10,707,627 B2
(45) Date of Patent: Jul. 7, 2020

(54) HYBRID CONNECTOR

(71) Applicant: Apple Inc., Cupertino, CA (US)

(72) Inventors: Reza Nasiri Mahalati, San Jose, CA (US); Blake R. Marshall, San Jose, CA (US); Liquan Tan, Sunnyvale, CA (US); Florence W. Ow, Los Altos Hills, CA (US); Alex C. Yeung, San Francisco, CA (US); John Raff, Menlo Park, CA (US); Robert Scritzky, Sunnyvale, CA (US); Wei-Hsuan Chen, New Taipei (TW); Eric S. Jol, San Jose, CA (US); Madhusudanan Keezhveedi Sampath, San Jose, CA (US); Nan Liu, Sunnyvale, CA (US); Gianpaolo Lisi, Los Gatos, CA (US); YiBo Liu, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/139,068

(22) Filed: Sep. 23, 2018

(65) Prior Publication Data
US 2019/0103715 A1 Apr. 4, 2019

Related U.S. Application Data

(60) Provisional application No. 62/722,790, filed on Aug. 24, 2018, provisional application No. 62/565,469, filed on Sep. 29, 2017.

(51) Int. Cl.
H01R 13/66 (2006.01)
H01R 13/22 (2006.01)
(Continued)

(52) U.S. Cl.
CPC ....... *H01R 13/6675* (2013.01); *G06F 1/1656* (2013.01); *H01F 27/255* (2013.01);
(Continued)

(58) Field of Classification Search
CPC .. H01R 13/6675; H01R 13/22; H01R 13/502; H01R 13/521; H01R 13/6633; H02J 50/10; G06F 1/1656
(Continued)

(56) References Cited

U.S. PATENT DOCUMENTS 5,213,314 A 5/1993 Kano et al.
5,295,844 A 3/1994 Koshikawa et al.
(Continued)

FOREIGN PATENT DOCUMENTS

AU 2011100424 6/2011
CN 103718384 4/2014
(Continued)

OTHER PUBLICATIONS

U.S. Appl. No. 15/948,050, First Action Interview Pilot Program Pre-Interview Communication dated May 23, 2018, 4 pages.
(Continued)

*Primary Examiner* — Abdullah A Riyami
*Assistant Examiner* — Nader J Alhawamdeh
(74) *Attorney, Agent, or Firm* — Kilpatrick Townsend & Stockton, LLP

(57) ABSTRACT

Hybrid connectors that may transfer power and data with a variety of electronic devices having different types of connector interfaces, may consume a minimal amount of surface area, depth, and volume in an electronic device, and may be readily manufactured.

20 Claims, 18 Drawing Sheets

(51) Int. Cl.
*H02J 50/10* (2016.01)
*H01R 12/77* (2011.01)
*H01R 13/52* (2006.01)
*G06F 1/16* (2006.01)
*H01F 27/255* (2006.01)
*H01F 38/14* (2006.01)
*H01R 13/502* (2006.01)
*H01R 27/00* (2006.01)
*H01F 27/28* (2006.01)
*H02J 7/34* (2006.01)
*H02J 7/00* (2006.01)
*H02J 7/02* (2016.01)

(52) U.S. Cl.
CPC ............ *H01F 38/14* (2013.01); *H01R 12/77* (2013.01); *H01R 13/22* (2013.01); *H01R 13/502* (2013.01); *H01R 13/521* (2013.01); *H01R 13/6633* (2013.01); *H02J 50/10* (2016.02); *H01F 2027/2857* (2013.01); *H01R 27/00* (2013.01); *H01R 2201/06* (2013.01); *H02J 7/0042* (2013.01); *H02J 7/025* (2013.01); *H02J 7/342* (2020.01)

(58) Field of Classification Search
USPC .................................................. 439/620.5, 7
See application file for complete search history.

(56) References Cited

U.S. PATENT DOCUMENTS

| | | | |
|---|---|---|---|
| 5,876,243 A | 3/1999 | Sangawa | |
| 5,980,335 A | 11/1999 | Barbieri et al. | |
| 6,780,019 B1 | 8/2004 | Ghosh et al. | |
| 6,976,799 B2 | 12/2005 | Kim et al. | |
| 7,306,494 B2 | 12/2007 | Soh et al. | |
| 7,355,137 B2 | 4/2008 | Kawasaki | |
| 7,661,968 B1 | 2/2010 | Duan et al. | |
| 8,138,717 B2 | 3/2012 | Chatterjee et al. | |
| 8,263,886 B2 | 9/2012 | Lin | |
| 8,344,836 B2 | 1/2013 | Lauder et al. | |
| 8,427,825 B2 | 4/2013 | Szczypinski | |
| 8,498,100 B1 | 7/2013 | Whitt, III | |
| 8,570,725 B2 | 10/2013 | Whitt, III | |
| 8,699,215 B2 | 4/2014 | Whitt, III | |
| 8,724,302 B2 | 5/2014 | Whitt, III | |
| 8,780,540 B2 | 7/2014 | Whitt, III | |
| 8,780,541 B2 | 7/2014 | Whitt, III | |
| 8,830,668 B2 | 9/2014 | Whitt, III | |
| 8,873,227 B2 | 10/2014 | Whitt, III | |
| 8,878,637 B2 | 11/2014 | Sartee | |
| 8,903,517 B2 | 12/2014 | Perek | |
| 8,947,864 B2 | 2/2015 | Whitt, III | |
| 8,953,310 B2 | 2/2015 | Smith | |
| 8,975,991 B2 | 3/2015 | Lauder | |
| 8,988,876 B2 | 3/2015 | Corbin | |
| 9,000,871 B2 | 4/2015 | Cencioni | |
| 9,036,340 B1 | 5/2015 | Colby | |
| 9,075,566 B2 | 7/2015 | Whitt, III | |
| 9,149,100 B2 | 10/2015 | Marshall | |
| 9,158,384 B2 | 10/2015 | Whitt, III | |
| 9,176,900 B2 | 11/2015 | Whitt, III | |
| 9,176,901 B2 | 11/2015 | Whitt, III | |
| 9,331,415 B2 | 5/2016 | Tagawa | |
| 9,335,793 B2 | 5/2016 | Rothkopf | |
| 9,455,759 B2 | 9/2016 | Jen | |
| 9,485,338 B2 | 11/2016 | Balaji | |
| 9,899,757 B2 | 2/2018 | Trent | |
| 9,948,018 B2 | 4/2018 | Wagman | |
| 10,153,577 B2 | 12/2018 | Wagman et al. | |
| 2004/0209489 A1 | 10/2004 | Clapper | |
| 2005/0026499 A1 | 2/2005 | Choi et al. | |
| 2007/0141860 A1 | 6/2007 | Hernandez et al. | |
| 2009/0098780 A1 | 4/2009 | Johansson et al. | |
| 2009/0247004 A1 | 10/2009 | Lou et al. | |
| 2009/0257207 A1 | 10/2009 | Wang | |
| 2010/0136801 A1 | 6/2010 | Limpkin et al. | |
| 2010/0226509 A1 | 9/2010 | Filson et al. | |
| 2010/0328230 A1 | 12/2010 | Faubert | |
| 2011/0051360 A1 | 3/2011 | Dabov | |
| 2011/0130048 A1 | 6/2011 | Haunberger | |
| 2012/0194448 A1* | 8/2012 | Rothkopf | A45C 13/002 345/173 |
| 2013/0035006 A1 | 2/2013 | Park et al. | |
| 2013/0162554 A1 | 6/2013 | Lauder | |
| 2013/0183861 A1 | 7/2013 | Chang et al. | |
| 2013/0322000 A1 | 12/2013 | Whit et al. | |
| 2014/0106594 A1* | 4/2014 | Skvoretz | H01R 13/74 439/345 |
| 2014/0204514 A1 | 7/2014 | Whitt, III | |
| 2014/0273546 A1 | 9/2014 | Harmon | |
| 2014/0285957 A1 | 9/2014 | Rohrbach et al. | |
| 2014/0377992 A1 | 12/2014 | Chang et al. | |
| 2015/0093922 A1 | 4/2015 | Bosscher et al. | |
| 2015/0127376 A1 | 5/2015 | Ortenzi et al. | |
| 2015/0194764 A1 | 7/2015 | Magana | |
| 2015/0241931 A1 | 8/2015 | Carnevali et al. | |
| 2016/0380395 A1 | 12/2016 | Lee | |
| 2017/0068276 A1 | 3/2017 | Wagman et al. | |
| 2017/0068286 A1 | 3/2017 | Esmaeili et al. | |
| 2017/0069993 A1 | 3/2017 | Wagman et al. | |
| 2017/0069994 A1 | 3/2017 | Wagman et al. | |
| 2017/0250578 A1 | 8/2017 | Kallman et al. | |
| 2018/0226739 A1 | 8/2018 | Wagman | |

FOREIGN PATENT DOCUMENTS

| | | |
|---|---|---|
| EP | 3133213 | 2/2017 |
| JP | S50-0935595 | 8/1975 |
| JP | 53-96691 | 8/1978 |
| JP | H10-208809 | 8/1998 |
| JP | H11-045747 | 2/1999 |
| JP | 2001-291543 | 10/2001 |
| JP | 2001/313137 | 11/2001 |
| JP | 3090710 U | 10/2002 |
| JP | 2003-151256 | 5/2003 |
| JP | 2006/120498 | 5/2006 |
| JP | 2013-048018 | 2/2013 |
| JP | 2013182839 | 9/2013 |
| KR | 20130089479 A | 8/2013 |
| TW | 498709 | 8/2002 |

OTHER PUBLICATIONS

U.S. Appl. No. 15/948,050, Notice of Allowance dated Aug. 7, 2018, 9 pages.
U.S. Appl. No. 16/214,121, First Action Interview Pilot Program Pre-Interview Communication dated Feb. 28, 2019, 4 pages.
U.S. Appl. No. 16/214,121, Notice of Allowance dated Apr. 19, 2019, 8 pages.
European Application No. 18189857.8, Extended European Search Report dated Dec. 13, 2018, 5 pages.
European Application No. 18197116.9, Extended European Search Report dated Feb. 25, 2019, 8 pages.
Office Action (English Translation) dated May 7, 2018 in Japanese Patent Application No. 2016-169764, 10 pages.
Office Action (English Translation) dated Jun. 5, 2018 in Chinese Patent Application No. 201610807734.X, 15 pages.
Ex parte Quayle Action dated Jun. 27, 2017 in U.S. Appl. No. 15/256,470, 8 pages.
European Search Report dated Feb. 3, 2017 in European Patent Application No. 16186532.4, 9 pages.
Examination Report No. 1 dated Apr. 28, 2017 in Australian Patent Application No. 2016222505, 3 pages.
Evaluation Report for Utility Model Patent dated May 26, 2017 in Chinese Patent No. ZL2016210417275, 19 pages.
First Action Interview Pilot Program Pre-Interview Communication dated Aug. 31, 2017 in U.S. Appl. No. 15/476,829, 4 pages.
Office Action (English Translation) dated Sep. 29, 2017 in Japanese Patent Application No. 2016-169764, 6 pages.

(56) References Cited

OTHER PUBLICATIONS

Office Action (English Translation) dated Aug. 19, 2019 in Korean Patent Application No. 10-2018-0116599, 13 pages.
Office Action (English Summary Translation) dated Sep. 9, 2019 in Japanese Patent Application No. 2018-183883, 7 pages.
Office Action (English Translation) dated Oct. 29, 2019 in Chinese Patent Application No. 20181114721.4, 10 pages.

* cited by examiner

HYBRID CONNECTOR

CROSS-REFERENCES TO RELATED APPLICATIONS

The present application claims the benefit of U.S. provisional application Nos. 62/565,469, filed Sep. 29, 2017, and 62/722,790, filed Aug. 24, 2018, which are incorporated by reference.

BACKGROUND

The number of types of electronic devices that are commercially available has increased tremendously the past few years and the rate of introduction of new devices shows no signs of abating. Devices such as tablets, laptops, netbooks, desktops, and all-in-one computers, smart phones, storage devices, portable media players, wearable computing devices, navigation systems, monitors, and others, have become ubiquitous.

Power and data may be provided from one device to another over cables that may include one or more wire conductors, fiber optic cables, or other conductors. Connector inserts may be located at each end of these cables and may be inserted into connector receptacles in the communicating or power transferring devices. In other systems, contacts on the devices may come into direct contact with each other without the need for intervening cables.

In systems where contacts on two electronic devices come into contact with each other, the contacts may be located in a connector at a surface of an electronic device. These connectors may include surface contacts that may be very efficient at transferring power and data between the two electronic devices. But it may be undesirable to not include contacts on some devices, particularly smaller accessories that may be handled often by users. Accordingly, it may be desirable to be able to transfer power and data with a variety of electronic devices having different types of connectors.

These surface contacts may often have a large surface area, a substantial depth, and consume a relatively large volume of space in the electronic device. The loss of this space may mean that the electronic device is either larger, includes a reduced set of functionality, or both. Also, these electronic devices may be manufactured in large numbers. A corresponding number of connectors may be manufactured for use in these devices. Any simplification in the manufacturing process of these connectors may yield tremendous savings in the manufacturing of these electronic devices.

Thus, what is needed are connectors that may transfer power and data with a variety of electronic devices having different types of connector interfaces, may consume a minimal amount of surface area, depth, and volume in an electronic device, and may be readily manufactured.

SUMMARY

Accordingly, embodiments of the present invention may provide hybrid connectors that may transfer power and data with a variety of electronic devices having different types of connector interfaces, may consume a minimal amount of surface area, depth, and volume in an electronic device, and may be readily manufactured.

An illustrative embodiment of the present invention may provide a contact assembly for a connector for an electronic device. This contact assembly may provide an efficient path for transferring power between devices. The contact assembly may include one, two, three, four, or more than four contacts. The contacts may be formed by machining, etching, printing, casting, forging, or by using a deep drawn or other process. The contacts may be supported by a housing, which may include a raised portion to be located in an opening in a device enclosure. Contacting surfaces of the contacts and a surface of the raised portion of the housing may be substantially flush with, or recessed a limited amount relative to, a surface of the device enclosure around the contacts. This surface may be curved or flat, or have other contours. Other contacts, such as fiber-optic contacts, may be included.

The contact assembly housings may include one or more backside recesses or depressions. These recesses or depressions may provide access to contacting portions or tabs of the contacts supported by the housing. One or more flexible circuit boards may be located in the depression and may include contacts on a surface to be soldered to or otherwise electrically connected to the contacting portions or tabs of the contacts supported by the housing.

In these and other embodiments of the present invention, the housings may be include a raised portion or surface around the contacting surfaces. Individual rings may extend from the raised portion or surface and form insulating rings around the contacts. The insulating rings may be contiguous and around the contacting surfaces of the contacts. The insulating rings may fit flush and contiguous in openings in a device enclosure. A backside of the housing may include posts or other alignment features for aligning the housing to a flexible circuit board. The backside of the housing may otherwise be substantially flat for mating with a flexible circuit board.

In these and other embodiments of the present invention, it may be desirable that power be provided to a second electronic device from a first electronic device in an efficient manner. In these situations, a physical electrical connection, such as one using the above contacts and contact assemblies, may be utilized. But in other situations, it may be desirable to not include a physical electrical connection that uses contacts. For example, it may be desirable that the electronic device have a smooth or even finish. The electronic device may be a type of device that is manipulated by users and the presence of contacts may be undesirable. Accordingly, in these and other embodiments of the present invention, inductive charging may be used to charge these electronic devices. This inductive charging may obviate the need for contacts on the second electronic device.

These and other embodiments of the present invention may therefore provide a combined connector that may include a wired connector as well as an inductive connector. In these and other embodiments of the present invention, the wired connector and inductive connector may be co-located and combined into a hybrid connector. This combination may simplify operation of an electronic device for a user. That is, a user may simply need to remember that a hybrid connector is in a specific location in the electronic device where each type of device (for example, devices with and without contacts) may be connected. This may help to alleviate confusion caused by having multiple connectors in different locations on the device. This combination may further allow a hybrid connector including both wired and inductive connectors to be located in a single opening in a device enclosure. Having a single opening may simplify manufacturing, prevent moisture leakage, and may improve overall device appearance.

In these and other embodiments of the present invention, a hybrid connector may include a ferrite and a plurality of contacts, where the contacts are between the ferrite and a surface of a device enclosure housing the hybrid connector. The contacts and ferrite may be located in an opening in the device enclosure. The opening may be covered by a window, where the contacts are available in openings in the window. The window may be formed of plastic, sapphire, or other material. The ferrite may be partially wrapped by a coil or winding. The ferrite and winding may be used to transfer power and data with a second electronic device having a first type of connector. For example, the first type of connector may include one, two, three, four, or more than four electrical contacts. The contacts may be used to transfer power and data with a third electronic device having a second type of connector. For example, the second connector may be inductive.

In these and other embodiments of the present invention, a hybrid connector may include a single electronic circuit coupled to the ferrite and the contacts to control power and data transfers over both the ferrite and contacts. To save space, this electronic circuit may be a module, such as a system-in-package module or other module.

Embodiments of the present invention may provide connector assemblies and hybrid connectors that may be located in various types of devices, such as portable computing devices, tablet computers, desktop computers, laptops, all-in-one computers, wearable computing devices, cell phones, smart phones, media phones, storage devices, keyboards, covers, cases, portable media players, navigation systems, monitors, power supplies, adapters, remote control devices, chargers, and other devices. These connector assemblies and hybrid connectors may provide pathways for signals and power compliant with various standards such as one of the Universal Serial Bus (USB) standards including USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future. In one example, the connector assemblies and hybrid connectors may be used to transfer a data signal, a power supply, and ground with a first type of electronic device using electrical contacts, and to inductively transfer power and data with a second type of electronic device. In various embodiments of the present invention, the data signal may be unidirectional or bidirectional and the power supply may be unidirectional or bidirectional.

Various embodiments of the present invention may incorporate one or more of these and the other features described herein. A better understanding of the nature and advantages of the present invention may be gained by reference to the following detailed description and the accompanying drawings.

DESCRIPTION OF EXEMPLARY EMBODIMENTS

Figure 1:
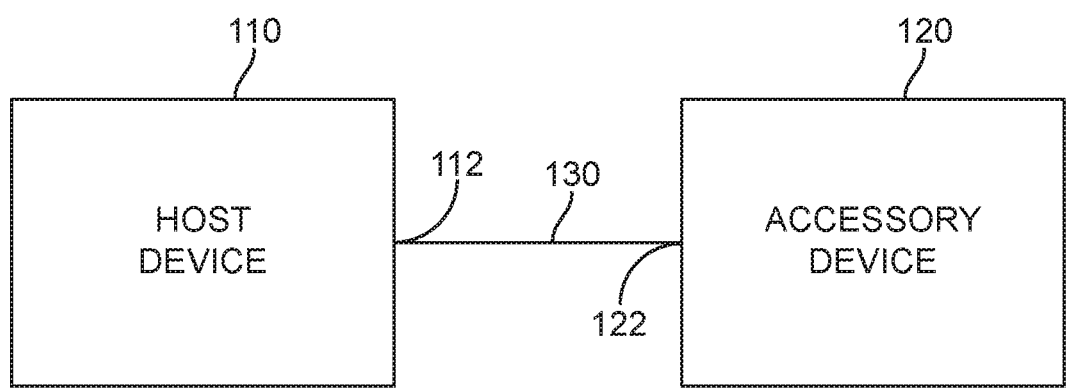
FIG. 1 illustrates an electronic system according to an embodiment of the present invention.

FIG. 1 illustrates an electronic system according to an embodiment of the present invention. This figure, as with the other included figures, is shown for illustrative purposes and does not limit either the possible embodiments of the present invention or the claims.

In this example, host device 110 may be connected to accessory device 120 in order to share data, power, or both. Specifically, connector 112 on host device 110 may be electrically connected to connector 122 on accessory device 120. Connector 112 on host device 110 may be electrically connected to connector 122 on accessory device 120 via cable 130. In other embodiments of the present invention, connector 112 on host device 110 may be directly and electrically connected to connector 122 on accessory device 120. In still other embodiments of the present invention, one or more optical contacts (not shown) supporting one or more optical connections between host device 110 and accessory device 120 may be included in connectors 112 and 122.

To facilitate a direction connection between connector 112 on host device 110 and connector 122 on accessory device 120, connector 112 and connector 122 may include surface mount contact assemblies. Examples of surface mount contact assemblies that may be used in connector 112 and connector 122 are shown in the following figures.

Figure 2:
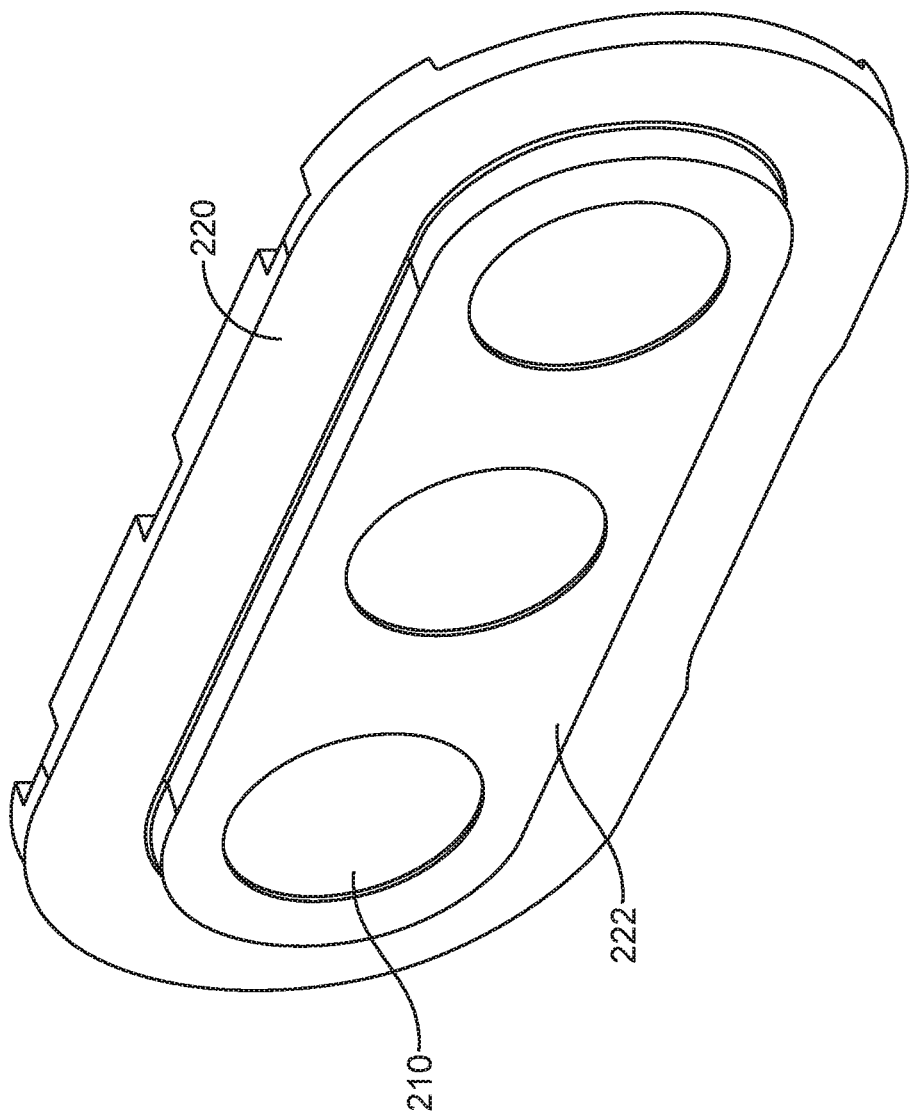
FIG. 2 illustrates a contact assembly that may be used in a connector according to an embodiment of the present invention.

FIG. 2 illustrates a contact assembly that may be used in a connector according to an embodiment of the present invention. This contact assembly may be used in connector 112 of host device 110, connector 122 of accessory device 120, or in another connector in another device. This contact assembly may include three contacts 210 supported by housing 220. Housing 220 may include a raised portion 222. Raised portion 222 may fit in an opening in a device enclosure (not shown) or another structure that may form a portion of a device enclosure that houses an electronic device. Raised portion 222 may act as an alignment feature to align the contact assembly to an opening in the device enclosure or device enclosure portion. Housing 220 may be formed of a nonconductive material, such as plastic. In this way, contacts 210 may be located at a surface of a device enclosure for an electronic device housing this contact assembly.

In these and other embodiments of the present invention, separate housings 220 may be provided for each contact 210. In some circumstances, having three contacts 210 in a single housing 220 may improve the control of a spacing of contacts 210 relative to each other. While in this example three contacts 210 are shown, in these and other embodiments of the present invention, one, two, four, or more than four contacts may be included. Contacts 210 and raised portion 222 of housing 220 may be substantially flush with, or recessed a limited amount relative to, a surrounding surface of a device enclosure. These surfaces may be curved, they may be substantially flat, or they may have other contours.

Contacts 210 may be formed in various ways. For example, contacts 210 may be formed by coining, machining, forging, printing, etching, stamping, or other appropriate technique. In these and other embodiments of the present invention, contacts 210 may be formed by a deep drawn process. More information on the manufacturing steps that may be used to form these contacts may be found in co-pending U.S. patent application Ser. No. 15/138,216, filed Apr. 26, 2017, which is incorporated by reference.

Contacts 210 may be formed of various materials. For example, contacts 210 may be formed by plating a copper, copper alloy, or copper bronze or other substrate. Examples of plating layers that may be used to plate contacts 210 and the other included contacts are described below. More information on the materials and plating, as well as other protective layers used to form these contacts may be found in co-pending U.S. patent application Ser. No. 15/138,216, filed Apr. 26, 2017, and Ser. No. 15/464,051, filed Mar. 20, 2017, as well as U.S. provisional application No. 62/718,306, filed Aug. 13, 2018, which are incorporated by reference. Other protective and other layers may be added as well, examples of which may be found in co-pending U.S. provisional application No. 62/718,306, filed Aug. 13, 2018, which is incorporated by reference.

In these and other embodiments of the present invention, contacts 210 may be used for various purposes. For example, contacts 210 in this contact assembly may be used to convey power, ground, data, and other electrical signals.

In these and other embodiments of the present invention, various adhesives may be used to secure these structures in place. Specifically, adhesive layers (not shown) may be used to secure contact 210 to housing 220. Adhesive layers (not shown) may also be used to secure housing 220 to the device enclosure.

Figure 3:
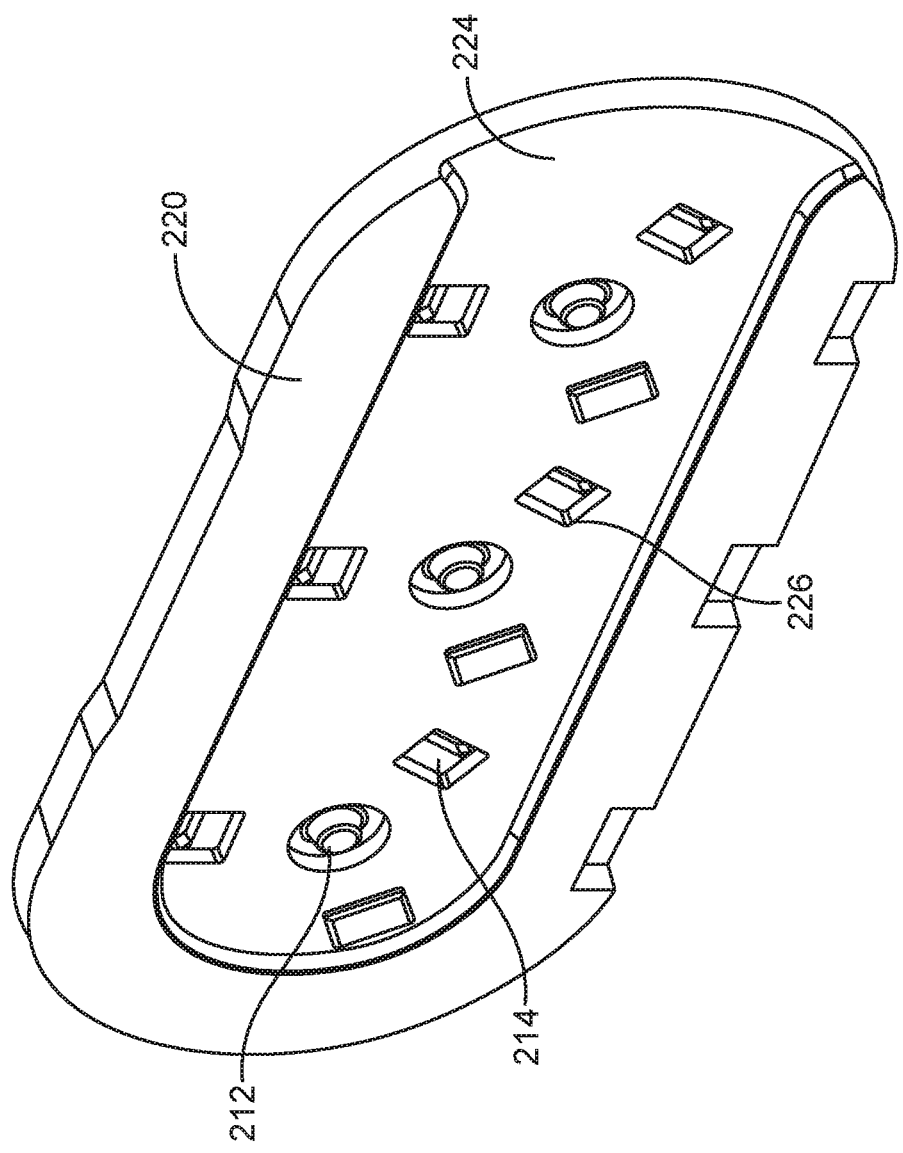
FIG. 3 illustrates a rear view of a contact assembly according to an embodiment of the present invention.

FIG. 3 illustrates a rear view of a contact assembly according to an embodiment of the present invention. Contacts 210 (shown in FIG. 2) may include contacting portions 212. Contacts 210 may include support tabs 214. Support tabs 214 may be aligned in openings 226 in housing 220 to hold contacts 210 in place relative to housing 220. A back side of housing 220 may include a recess or depressed portion 224. A flexible circuit board (not shown) may be located in recess or depressed portion 224. The flexible circuit board may include contacts for forming electrical connections with contacting portions 212 of contacts 210. Contacts on the flexible circuit board may be attached to contacting portions 212 of contacts 210 by soldering, laser, spot, or resistance welding, or by other method. The flexible circuit board may route electrical signals to circuitry inside an electronic device housing this contact assembly.

Figure 4:
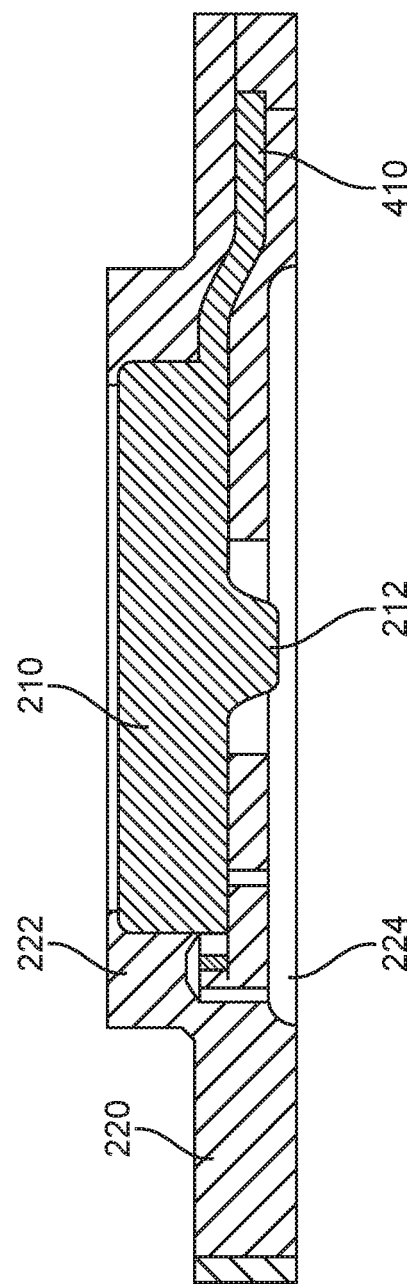
FIG. 4 illustrates a cutaway side view of a contact assembly according to an embodiment of the present invention.

FIG. 4 illustrates a cutaway side view of a contact assembly according to an embodiment of the present invention. Contacts 210 may be supported by housing 220. Housing 220 may include raised portion 222. Raised portion 222 may fit in an opening in a device enclosure or portion of a device enclosure housing this contact assembly. Contact 210 may include handle 410. Handle 410 may be connected to a carrier during manufacturing. The carrier may be used to manipulate groups of contacts 210 during manufacturing. This carrier may be removed leaving behind handle 410 during manufacturing. Contact 210 may then be inserted into housing 220. In these and other embodiments of the present invention, housing 220 may instead be formed around contact 210, for example by molding. Contact 210 may include contacting portion 212. Contacting portions 212 may be available to be connected to a flexible circuit board located in recess or depressed portion 224.

Figure 5:
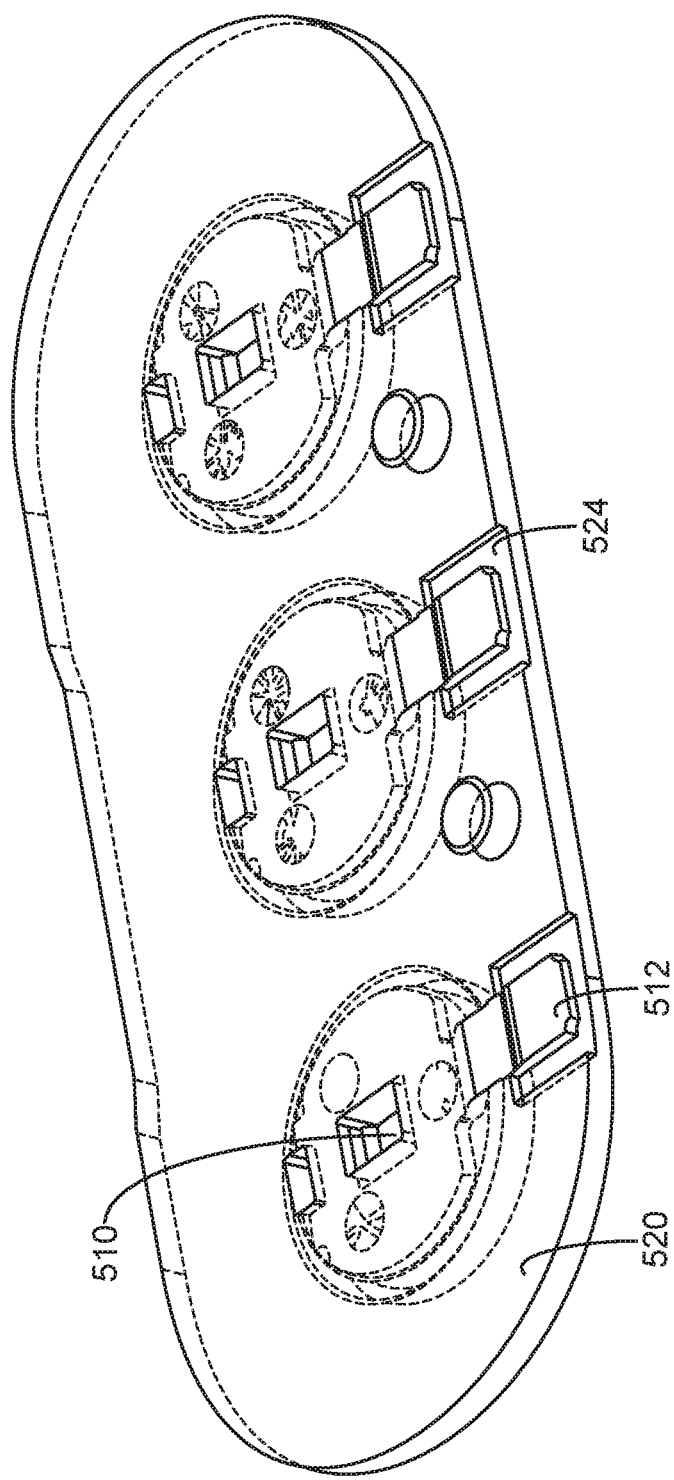
FIG. 5 illustrates a back side of another contact assembly according to an embodiment of the present invention.

FIG. 5 illustrates a back side of another contact assembly according to an embodiment of the present invention. In this example, contacts 510 may be located in housing 520. Contacts 510 may include contacting portions 512. Contacting portions 512 may be handle portions, such as handle 410 in FIG. 4. In these and other embodiments of the present invention, contacting portions 512 may be or include other portions of contacts 510. One or more flexible circuit boards (not shown) may include tabs that may align with recesses or depressed portions 524. These flexible circuit board tabs may include contacts to form electrical connections with contacting portions 512 of contacts 510. In these and other embodiments of the present invention, housing 520 may support one, two, four, or more than four contacts 510.

Figure 6:
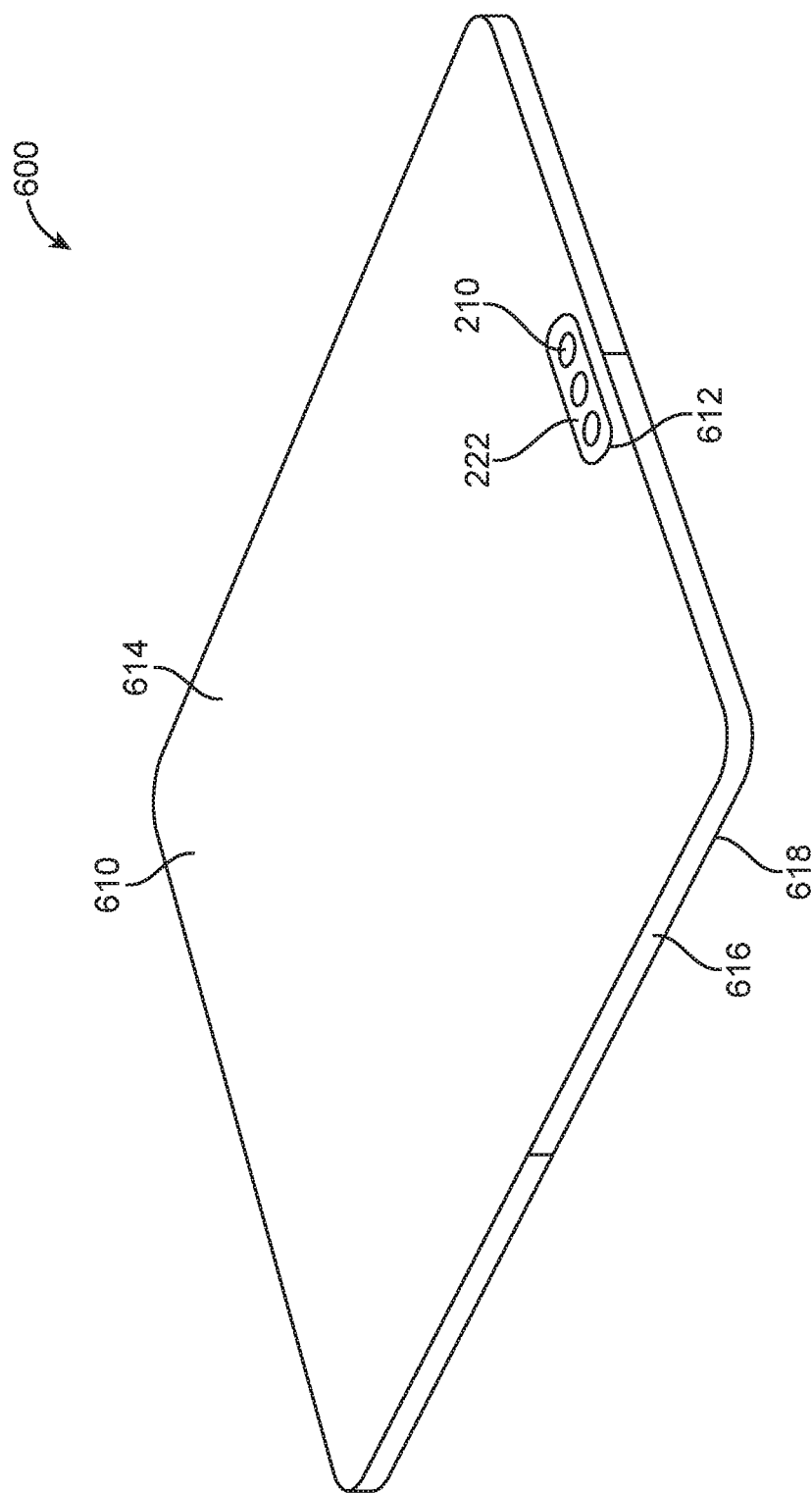
FIG. 6 illustrates a contact assembly in a device enclosure according to an embodiment of the present invention.

FIG. 6 illustrates a contact assembly in a device enclosure according to an embodiment of the present invention. The contact assembly may include contacts 210 in raised portion 222 of housing 220 (shown in FIG. 2), though other contact assemblies may be used consistent with embodiments of the present invention. Raised portion 222 of housing 220 may be located in an opening 612 in device enclosure 610. Opening 612 may be located in a back or rear surface 614 of device enclosure 610. In these and other embodiments of the present invention, opening 612 may be located in a side 616 or front 618 of device enclosure 610.

Device enclosure 610 may partially or substantially house electronic device 600. One or more screens, buttons, or other components (not shown) may be located at a surface of electronic device 600. Electronic device 600 may be a smartphone, mobile computing device, portable computing device, laptop, tablet, or other computing device. Contacts 210 may form electrical connections with contacts on a second or accessory electronic device (not shown) when electronic device 600 is mated with the second or accessory device. Raised portion 222 of housing 220 may insulate contacts 210 from each other and from device enclosure 610.

Figure 7:
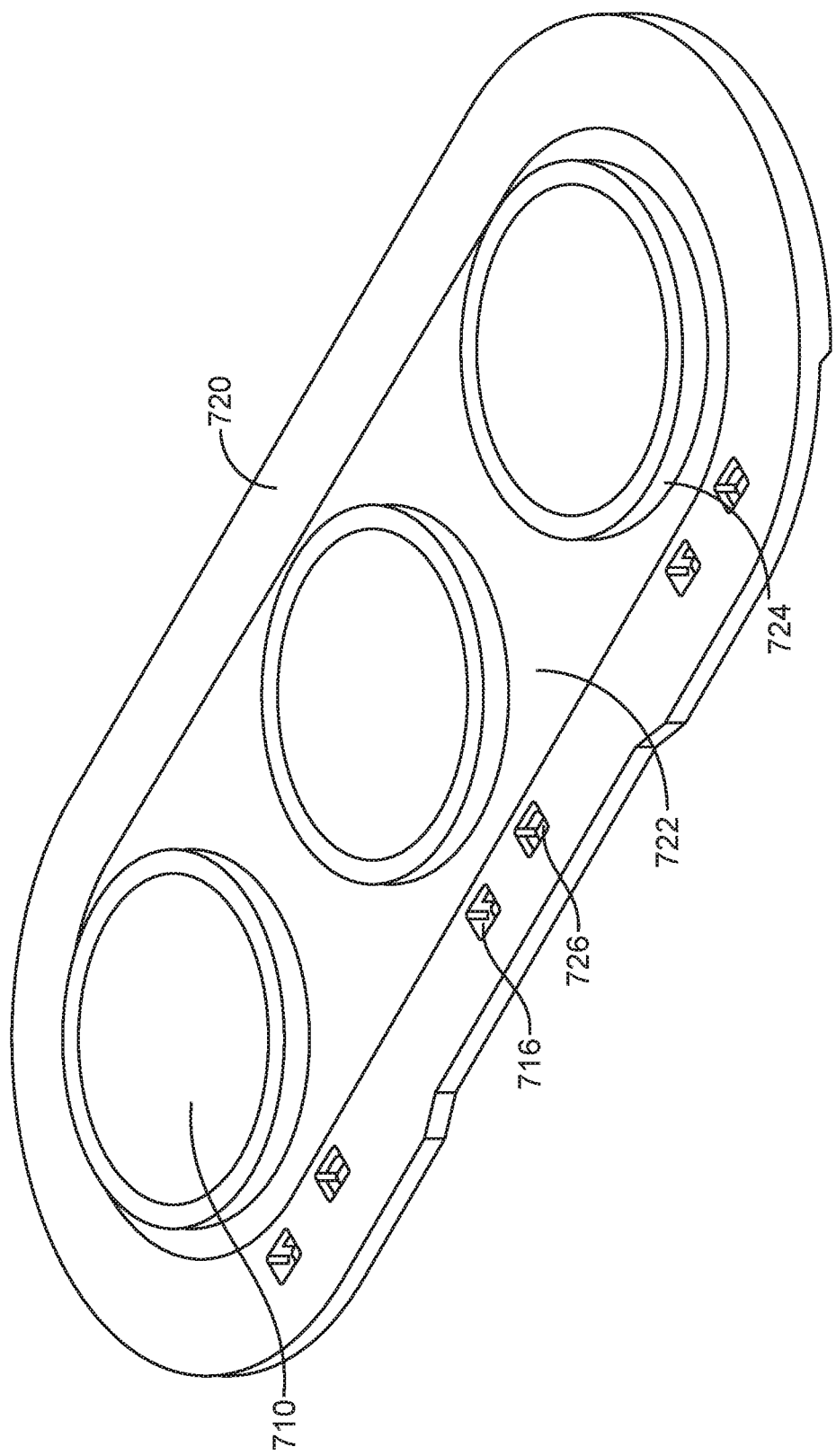
FIG. 7 illustrates a contact assembly according to an embodiment of the present invention.

FIG. 7 illustrates a contact assembly that may be used in a connector according to an embodiment of the present invention. This contact assembly may be used in connector 112 of host device 110, connector 122 of accessory device 120, or in another connector in another device. This contact assembly may include three contacts 710 supported by housing 720. Contacts 710 may be the same or similar as contacts 210 in FIG. 2 and contacts 510 of FIG. 5. Contacts 710 may include support tabs 716 in openings 726 to hold contacts 710 in place relative to housing 720. Housing 720 may include a raised portion 722. Raised portions or insulating rings 724 may extend from raised portion 722. Each raised portion or insulating ring 724 may surround a corresponding contact 710. Each raised portion 722 may fit in a corresponding opening in a device enclosure (not shown) or another structure that may form a portion of a device enclosure that houses an electronic device. Raised portion 722 and insulating rings 724 may act as alignment features to align the contact assembly to an opening in the device enclosure or device enclosure portion. Housing 720 may be formed of a nonconductive material, such as plastic. In this way, contacts 710 may be located at a surface of a device enclosure for an electronic device housing this contact assembly.

In these and other embodiments of the present invention, separate housings 720 may be provided for each contact 710. In some circumstances, having three contacts 710 in a single housing 720 may improve the control of a spacing of contacts 710 relative to each other. While in this example three contacts 710 are shown, in these and other embodiments of the present invention, one, two, four, or more than four contacts may be included. Contacts 710 and a top surface of raised portions or insulating rings 724 of housing 720 may be substantially flush with, or recessed a limited amount relative to, a surrounding surface of a device enclosure. These surfaces may be curved, they may be substantially flat, or they may have other contours.

Contacts 710 may be formed in various ways. For example, contacts 710 may be formed by coining, machining, forging, printing, etching, stamping, or other appropriate technique. In these and other embodiments of the present invention, contacts 710 may be formed by a deep drawn process. More information about these contacts and on the manufacturing steps that may be used to form these contacts may be found in co-pending U.S. patent application Ser. No. 15/138,216, filed Apr. 26, 2017, which is incorporated by reference.

Contacts 710 may be formed of various materials. For example, contacts 710 may be formed by plating a copper, copper alloy, or copper bronze or other substrate. Examples of plating layers that may be used to plate contacts 710 and the other included contacts are described below. More information on the materials and plating used to form these contacts may be found in co-pending U.S. patent application Ser. No. 15/138,216, filed Apr. 26, 2017, and Ser. No. 15/464,051, filed Mar. 20, 2017, as well as U.S. provisional application No. 62/718,306, filed Aug. 13, 2018, which are incorporated by reference. Other protective and other layers may be added as well, examples of which may be found in co-pending U.S. provisional application No. 62/718,306, filed Aug. 13, 2018, which is incorporated by reference.

In these and other embodiments of the present invention, contacts 710 may be used for various purposes. For example, contacts 710 in this contact assembly may be used to convey power, ground, data, and other electrical signals.

In these and other embodiments of the present invention, various adhesives may be used to secure these structures in place. Specifically, adhesive layers (not shown) may be used to secure contact 710 to housing 720. Adhesive layers (not shown) may also be used to secure housing 720 to the device enclosure.

Figure 8:
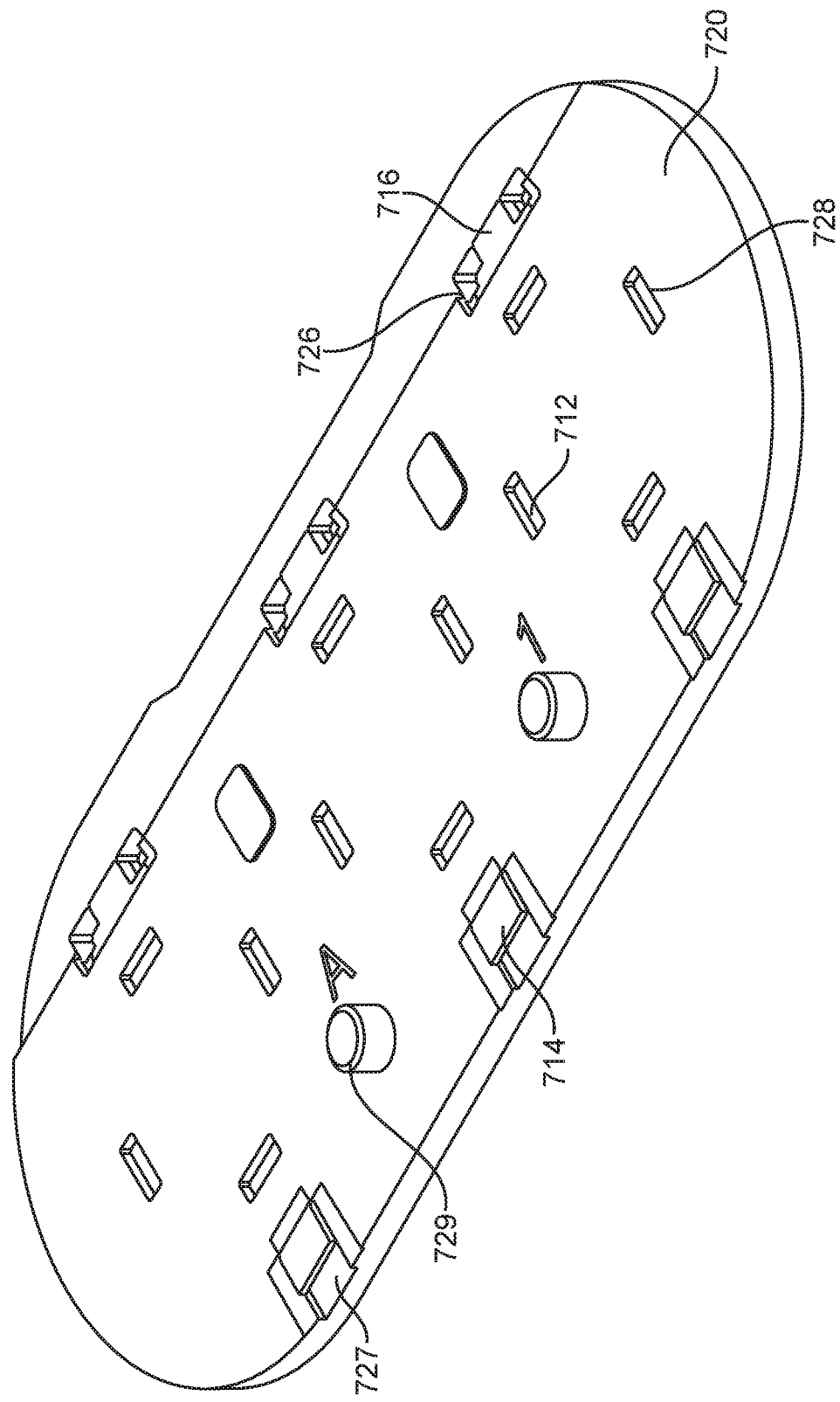
FIG. 8 illustrates a rear view of a contact assembly according to an embodiment of the present invention.

FIG. 8 illustrates a rear view of a contact assembly according to an embodiment of the present invention. Contacts 710 (shown in FIG. 7) may include contacting portions 712 in openings 728. Contacts 710 may include support tabs 716. Support tabs 716 may be aligned in openings 726 in housing 720 to hold contacts 710 in place relative to housing 720. A back side of housing 720 may include recesses or depressed portions 727. Portions or tabs of the flexible circuit board (not shown) may be located in recesses or depressed portions 727. The flexible circuit board may include contacts for forming electrical connections with contacting portions 714 of contacts 710. Contacts on the flexible circuit board may be attached to contacting portions 714 of contacts 710 by soldering, laser, spot, or resistance welding, or by other method. The flexible circuit board may route electrical signals to circuitry inside an electronic device housing this contact assembly. Posts 729 may extend from a backside of housing 720. Posts 729 may be used to align flexible circuit board 1040 (shown in FIG. 10) or other structure to housing 720.

In the example of FIGS. 7 and 8, housing 720 may be include a raised portion 722 around contacting surfaces of contacts 710. Individual rings may extend from the raised portion 722 and form insulating rings 724 around contacts 710. Insulating rings 724 may be contiguous and around the contacting surfaces of contacts 710. Insulating rings 724 may fit flush and contiguous in openings 912 in device enclosure 910 (shown in FIG. 9). A backside of housing 720 may include posts 729 or other alignment features for aligning the housing to flexible circuit board 1040 (shown in FIG. 10.) The backside of housing 720 may otherwise be substantially flat for mating with flexible circuit board 1040, such that flexible circuit board 1040 at least substantially covers the backside of housing 720.

Figure 9:
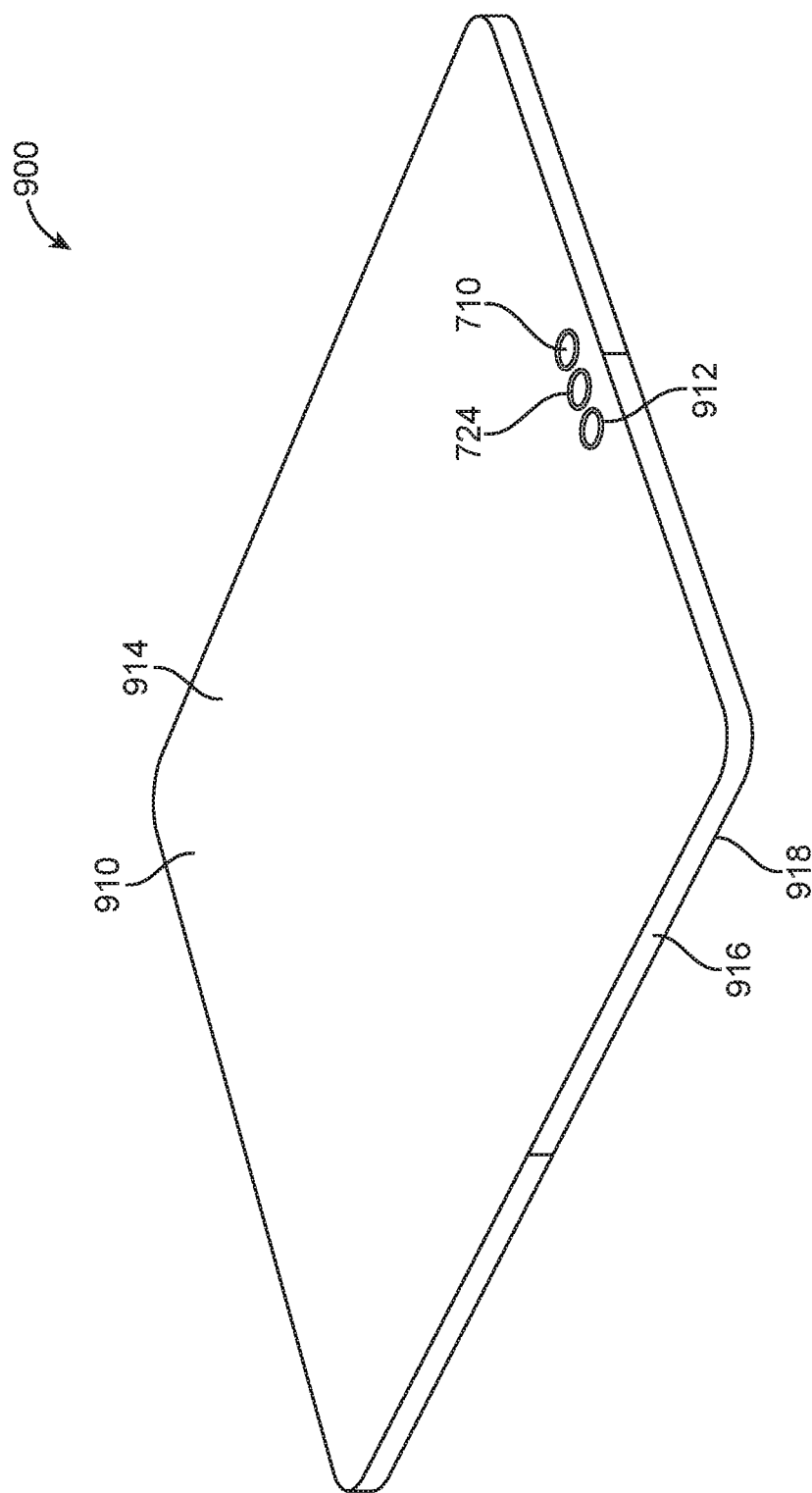
FIG. 9 illustrates a contact assembly in a device enclosure according to an embodiment of the present invention.

FIG. 9 illustrates a contact assembly in a device enclosure according to an embodiment of the present invention. The contact assembly may include contacts 710 in insulating rings 724 of housing 720 (shown in FIG. 7), though other contact assemblies may be used consistent with embodiments of the present invention. Insulating rings 724 of housing 720 may each be located in openings 912 in device enclosure 910. Openings 912 may be located in a backside 914 of device enclosure 910. In these and other embodiments of the present invention, openings 912 may be located in a side 916 or front 918 of device enclosure 910.

Device enclosure 910 may partially or substantially house electronic device 900. One or more screens, buttons, or other components (not shown) may be located at a surface of electronic device 900. Electronic device 900 may be a smartphone, mobile computing device, portable computing device, laptop, tablet, or other computing device. Contacts 710 may form electrical connections with contacts on a second or accessory electronic device (not shown) when electronic device 900 is mated with the second or accessory device. Insulating rings 724 of housing 720 may insulate contacts 710 from device enclosure 910.

Figure 10:
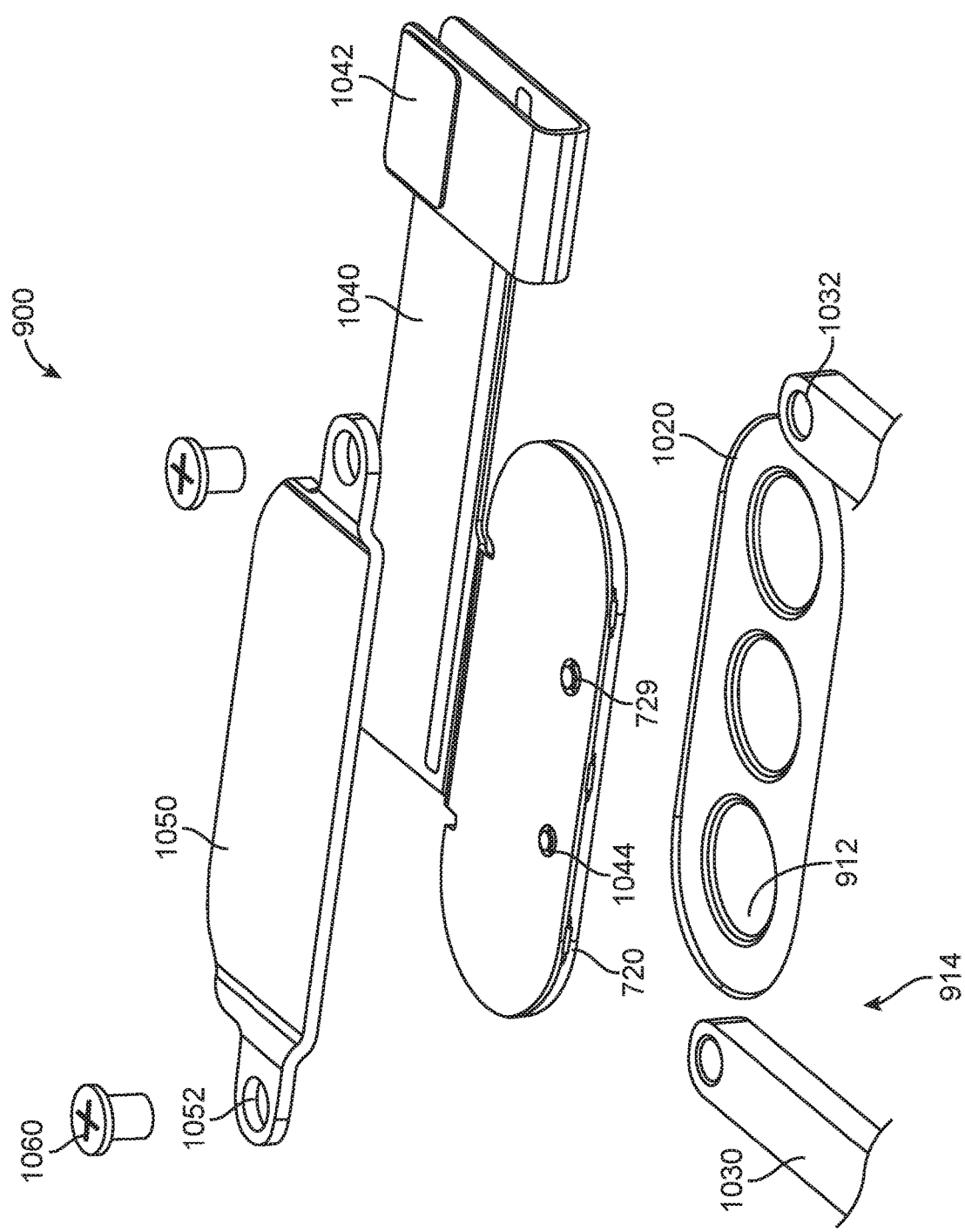
FIG. 10 illustrates the assembly of contact assembly for a connector in a device enclosure according to an embodiment of the present invention.

FIG. 10 illustrates the assembly of contact assembly for a connector in a device enclosure according to an embodiment of the present invention. In this example, recess 1020 may be formed in an inside surface of backside 914 of device enclosure 910 for electronic device 900 (shown in FIG. 9.) Openings 912 may be formed in recess 1020. Recess 1020 may accept raised portion 722 (shown in FIG. 7) of housing 720. Contacting surfaces of contacts 710 and insulating rings 724 may be placed in openings 912. This arrangement be used to accurately align contacts 710 in openings 912 in device enclosure 910.

Flexible circuit board 1040 may include openings 1044. Posts 729 on a back side of housing 720 may fit in openings 1044. Flexible circuit board 1040 may be glued or soldered to a back side of housing 720. For example, contacts on flexible circuit board 1040 may be soldered to contacting portion 714 or support tab 716 (or both) on the backside of housing 720 (shown in FIG. 8.) Flexible circuit board 1040 may include connector 1042, which may connect to a printed circuit board, second flexible circuit board, or other appropriate substrate. Cowling or bracket 1050 may be placed against a back side of housing 720 to secure contacts 710 in place. Bracket 1050 may include one or more openings 1052. Openings 1052 may be located on each side of bracket 1050, or they may be located elsewhere. Support structures 1030 may be formed as part of, or attached to, an inside surface of a backside 914 of device enclosure 910. Support structures 1030 may include holes 1032. Holes 1032 may be threaded. Fasteners 1060 may pass through openings 1052 in bracket 1050 and into holes 1032 to secure bracket 1050 in place relative to device enclosure 910. Shims, gaskets, or both may be located between housing 720 and recess 1020, or between housing 720 and flexible circuit board 1040, or both. Adhesive or adhesive layers may be used between either or both housing 720 and recess 1020 and between housing 720 and flexible circuit board 1040. Again, recess 1020 and the illustrated assembly may be located in a side 916, front 918, or elsewhere in electronic device enclosure 910.

In this example, housing 720 may be include a raised portion 722 around contacting surfaces of contacts 710 (shown in FIG. 7.) Individual rings may extend from the raised portion 722 and form insulating rings 724 around contacts 710 (shown in FIG. 7.) Insulating rings 724 may be contiguous and around the contacting surfaces of contacts 710. Insulating rings 724 may fit flush and contiguous in openings 912 in device enclosure 910. A backside of housing 720 may include posts 729 or other alignment features for aligning the housing to flexible circuit board 1040. The backside of housing 720 may otherwise be substantially flat for mating with flexible circuit board 1040, such that flexible circuit board 1040 at least substantially covers the backside of housing 720.

Again, these contacts assemblies may be located on electronic devices and may form wired electronic connections with corresponding contacts assemblies on second electronic devices. The contacts of these contacts assemblies may be used to convey power, data, or both, between these electronic devices. These wired electronic connections may transfer power and data in an efficient manner.

In these and other embodiments of the present invention, it may be desirable that power be provided to a second electronic device from a first electronic device in an efficient manner. In these situations, a physical electrical connection may provide an efficient path for conveying power. Contact assemblies, such as the above contact assemblies, may be employed in these physical electrical connections. But in other situations, it may be desirable to not use a physical electrical connection. For example, it may be desirable that the second electronic device have a smooth or even finish. The second electronic device may be a type of device that is manipulated by users and the presence of contacts may be undesirable. Accordingly, in these and other embodiments of the present invention, inductive charging may be used to charge the second electronic devices. This inductive charging may obviate the need for contacts on the second electronic device.

These and other embodiments of the present invention may therefore provide a combined connector that may include a wired connector as well as an inductive connector. In these and other embodiments of the present invention, the wired connector and inductive connector may be co-located and combined into a hybrid connector. This combination may simplify operation of an electronic device for user. That is, a user may simply need to remember that a hybrid connector is in a specific location in the electronic device, where each type of device, that is devices with and without contacts, may be connected. This may help to alleviate confusion caused by having multiple connectors in different locations on the device. This combination may further allow a hybrid connector including both wired and inductive connectors to be located in a single opening in a device enclosure. Having a single opening may simplify manufacturing, it may help to prevent moisture leakage, and may improve overall device appearance. An example is shown in the following figure.

Figure 11:
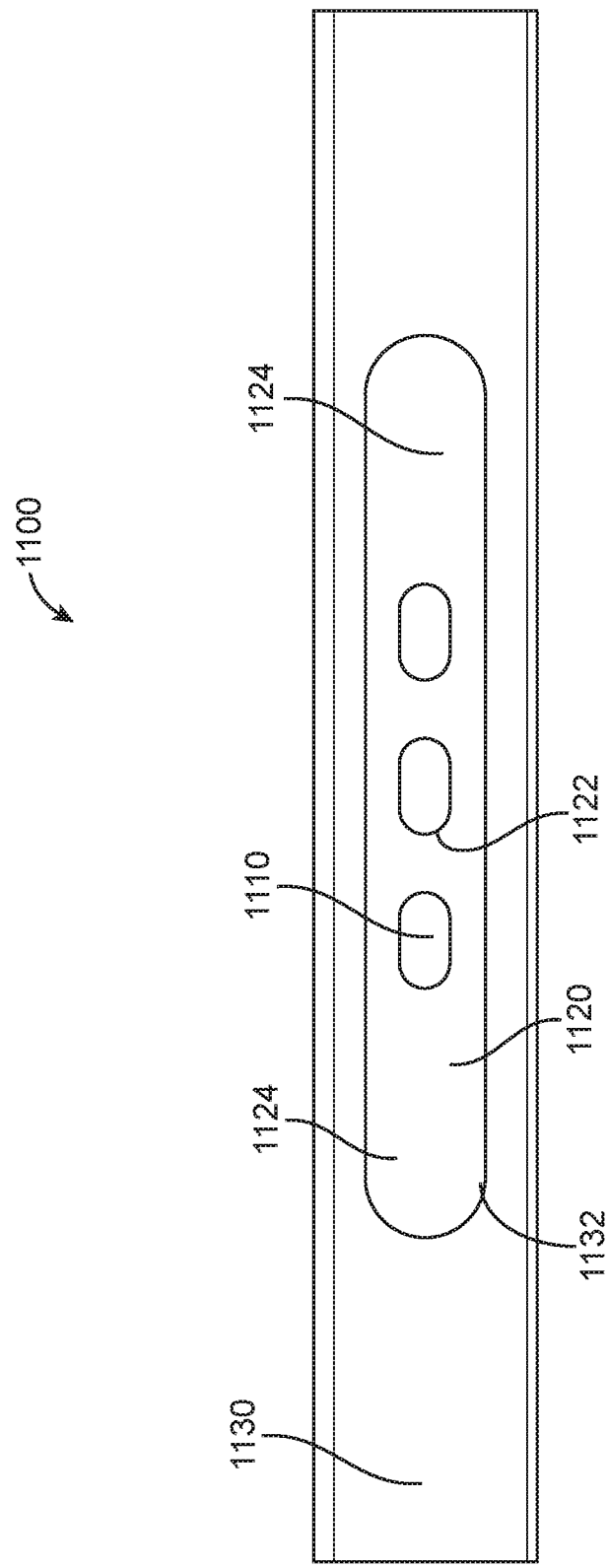
FIG. 11 illustrates a front view of a hybrid connector according to an embodiment of the present invention.

FIG. 11 illustrates a front view of a hybrid connector according to an embodiment of the present invention. Electronic device 1100 may be substantially housed by device enclosure 1130. The hybrid connector may be located in window 1120 in opening 1132 of device enclosure 1130. Contacts 1110 may be located in openings 1122 in window 1120. Magnetic field lines for inductive charging may enter and exit the hybrid connector at locations 1124 of window 1120.

Window 1120 may be formed of various materials in these and other embodiments of the present invention. For example, window 1120 may be formed of plastic, sapphire, or other material. Contacts 1110 may be the same or similar as contacts 210, 510, 710, or other contacts consistent with embodiments of the present invention. They may be manufactured and plated using the same or similar processes and materials. While contacts 1110 are shown as having an elongated shape, these, and the other contacts shown herein, may have a circular or approximately circular shape as contacts 210, shown in FIG. 2, contacts 510 shown in FIG. 5, and contacts 710, shown in FIG. 7.

Figure 12:
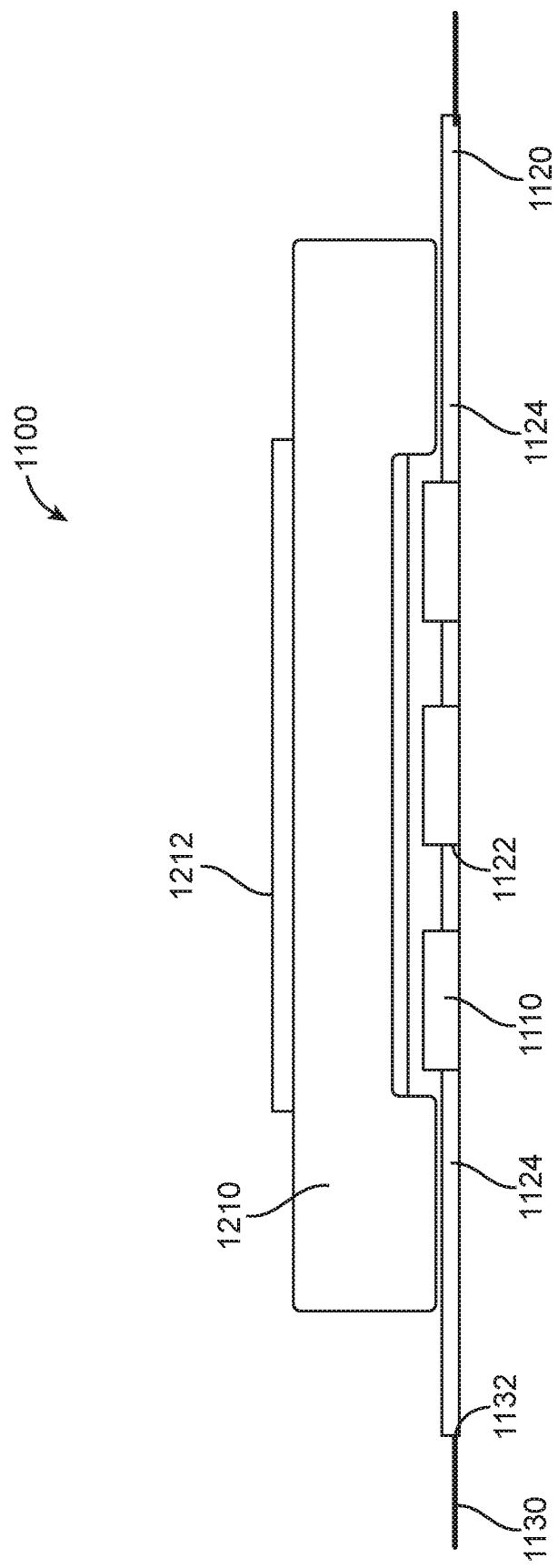
FIG. 12 illustrates a top view of a hybrid connector according to an embodiment of the present invention.

FIG. 12 illustrates a top view of a hybrid connector according to an embodiment of the present invention. Again, window 1120 may be located in opening 1132 in device enclosure 1130. Contacts 1110 may be located in openings 1122 in window 1120. Ferrite 1210 may be partially surrounded by windings 1212. Current may flow through windings 1212, thereby generating a magnetic field in ferrite 1210. Magnetic field lines generated by the current in windings 1212 may enter and exit electronic device 1100 through locations 1124 in window 1120. Contacts 1110 may be located between a surface of device enclosure 1130 and ferrite 1210.

Again, the hybrid connector shown above may be used to connect to the second electronic devices having contacts or that are capable of being inductively charged. Examples are shown in the following figures.

Figure 13:
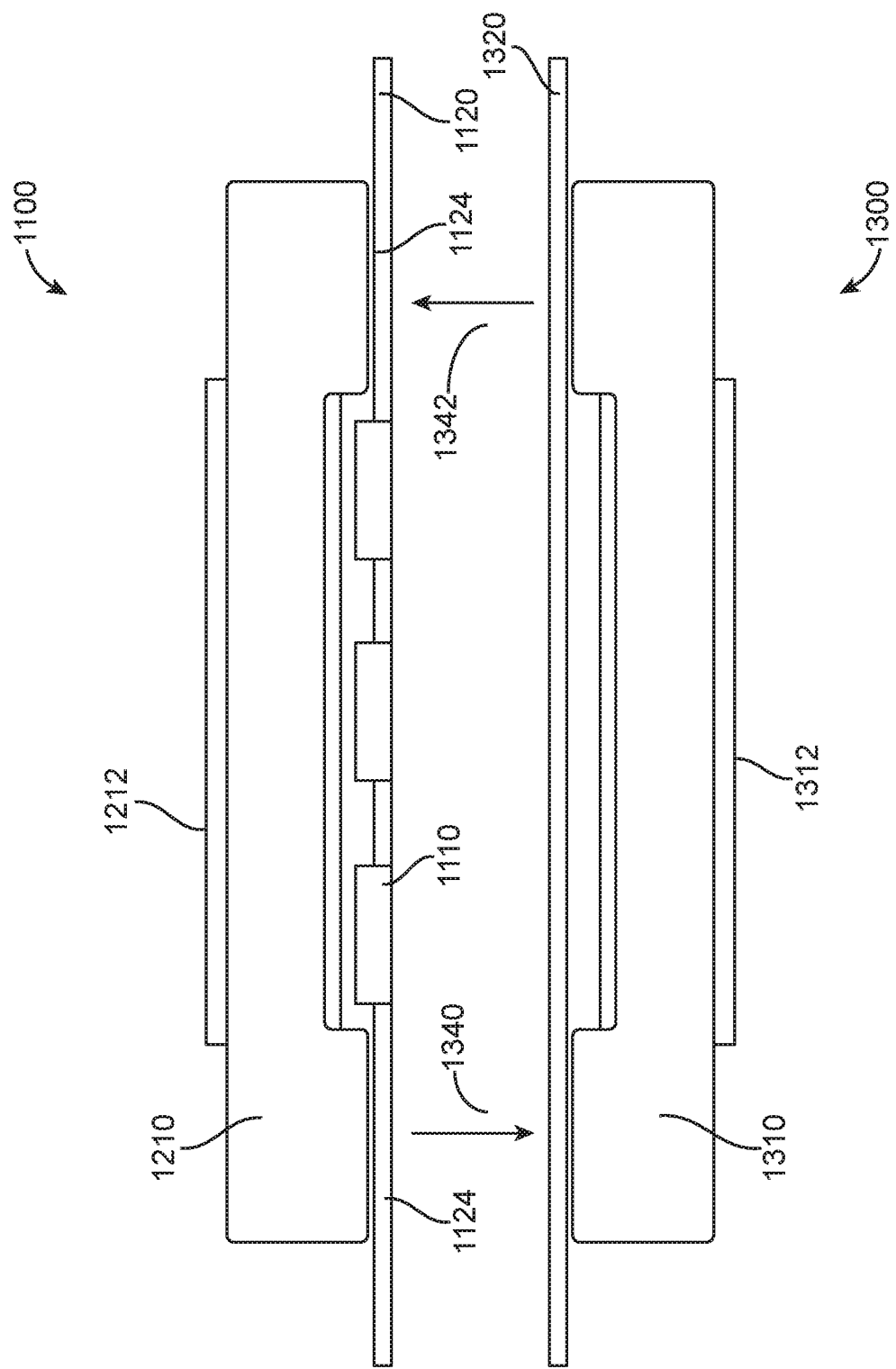
FIG. 13 illustrates an electronic device providing power, data, or both, to a second electronic device using a hybrid connector according to an embodiment of the present invention.

FIG. 13 illustrates an electronic device providing power, data, or both, to a second electronic device using a hybrid connector according to an embodiment of the present invention. Again, electronic device 1100 may include an inductive charging port including ferrite 1210 partially surrounded by windings 1212. When current is applied to windings 1212, a magnetic field, shown here as magnetic field lines 1340 and 1342, may be generated. This field may be received by ferrite 1310 in second electronic device 1300. Specifically, field lines generated by ferrite 1210 may pass through locations 1124 in window 1120 of electronic device 1100 and window 1320 of second electronic device 1300 and through ferrite 1310. This magnetic field may generate a current in windings 1312 in second electronic device 1300. This current may be used to charge a battery, provide power for circuitry, or both, in second electronic device 1300.

In this way, power may be transferred from electronic device 1100 to second electronic device 1300. In these and other embodiments of the present invention, power may be transferred in the reverse direction, from second electronic device 1300 to electronic device 1100. In these and other embodiments of the present invention, data may be transmitted using these paths as well. For example, a current applied to windings 1212 may be an alternating or AC signal. This signal may have a frequency of 0.5 MHz, between 0.5 and 0.8 MHz, between 0.75 and 1.25 MHz, 1.0 MHz, 1.5 MHz, between 1.0 MHz and 1.5 MHz, or it may have another frequency. The frequency of this signal may be modulated to convey data. For example, this signal may be modulated with a signal that has a frequency of 2 kHz, 5 kHz, 10 kHz, or other frequency. This modulation may be detected and decoded in second electronic device 1300. Also, in these and other embodiments of the present invention, data may also be transferred from second electronic device 1300 to electronic device 1100.

Instead of frequency modulation, pulse modulation or other types of modulation may be used to convey data using ferrites 1210 and 1310. For example, in these and other embodiments of the present invention, the signal applied to windings 1212 may be interrupted, stopped, or otherwise amplitude modulated in a pattern. The pattern may be used to convey data. Also, in these and other embodiments of the present invention, data may also be transferred from second electronic device 1300 to electronic device 1100.

Either or both electronic device 1100 or second electronic device 1300 may provide a low rate "pinging" signal that may be used in detecting a connection to the other device. For example, electronic device 1100 may transmit a burst at 1 MHz or other frequency once every second, or every few seconds, until a connection is detected. Second electronic device 1300 may detect the pinging signal and respond by sending identifying or other information to electronic device 1100.

In these and other embodiments of the present invention, electronic device 1100 may be a host device such as a portable computing device, laptop, or other type of electronic device. Second electronic device 1300 may be an accessory such as a card reader, stylus, pencil, sensor device, keyboard, or other device.

Figure 14:
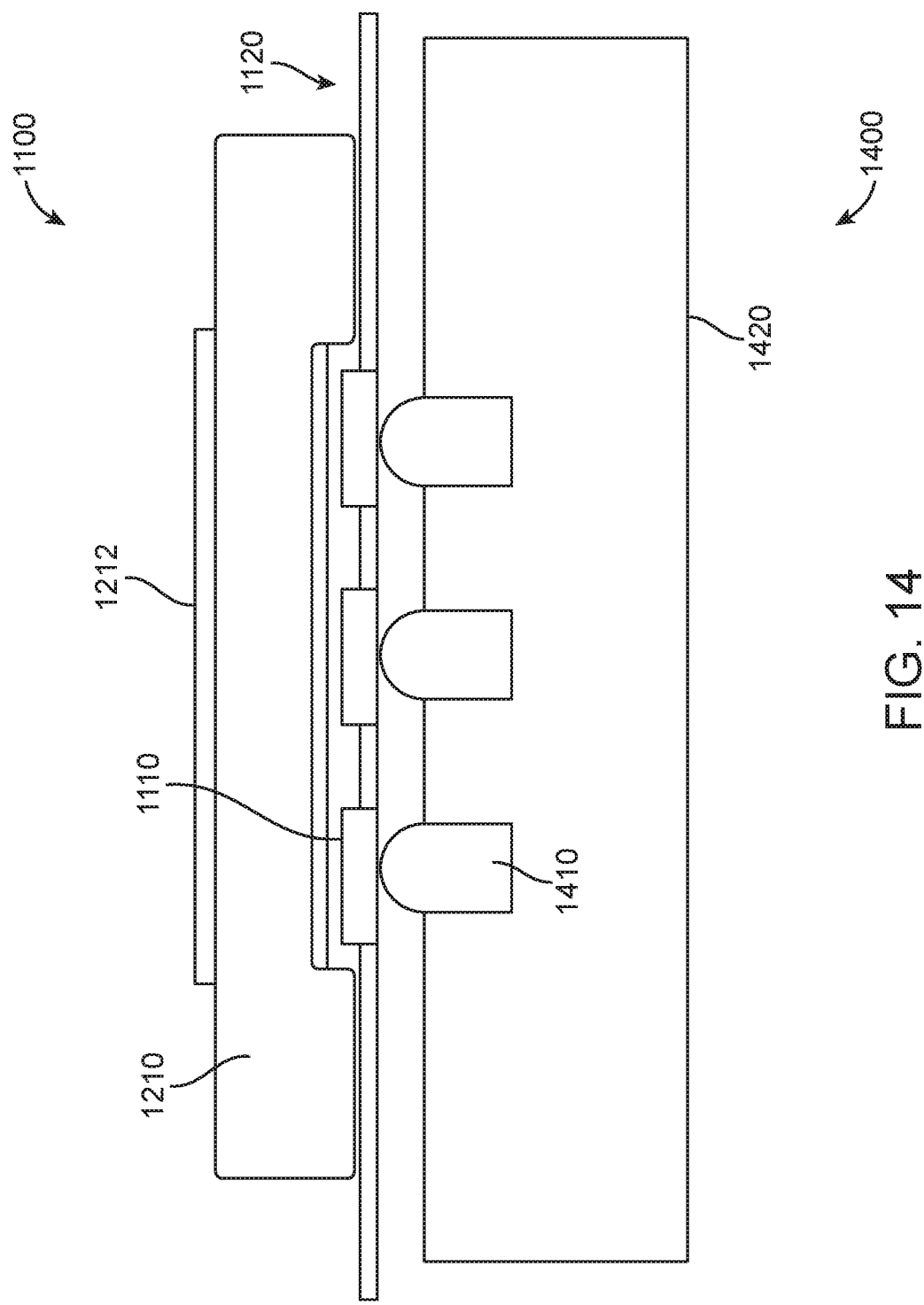
FIG. 14 illustrates an electronic device providing power, data, or both, to a third electronic device using a hybrid connector according to an embodiment of the present invention.

FIG. 14 illustrates an electronic device providing power, data, or both to a third electronic device using a hybrid connector according to an embodiment of the present invention. Again, electronic device 1100 may include contacts 1110. Contacts 1110 may mate with corresponding connector contacts 1410 on third electronic device 1400. Contacts 1410 may be spring-loaded contacts or other types of contacts. Contacts 1410 may be supported by housing, device enclosure, or other structure 1420. In this way, electronic device 1100 and third electronic device 1400 may share power, data, or both. In these and other embodiments of the present invention, some or all of contacts 1110 and 1410 may be replaced by, or supplemented by, fiber-optic or other types of contacts.

In these and other embodiments of the present invention, electronic device 1100 may be a host device such as a portable computing device, laptop, or other type of electronic device. Third electronic device 1400 may be accessories such as a card readers, styluses, pencils, sensor devices, keyboards, or other devices.

In these and other embodiments of the present invention, additional magnets and magnetic elements (not shown) may be used to align second electronic device 1300 and third electronic devices 1400 to electronic device 1100. Examples of these magnetic structures may be found in co-pending United States provisional application number 62/565,460, filed, Sep. 29, 2017, which is incorporated by reference.

Figure 15:
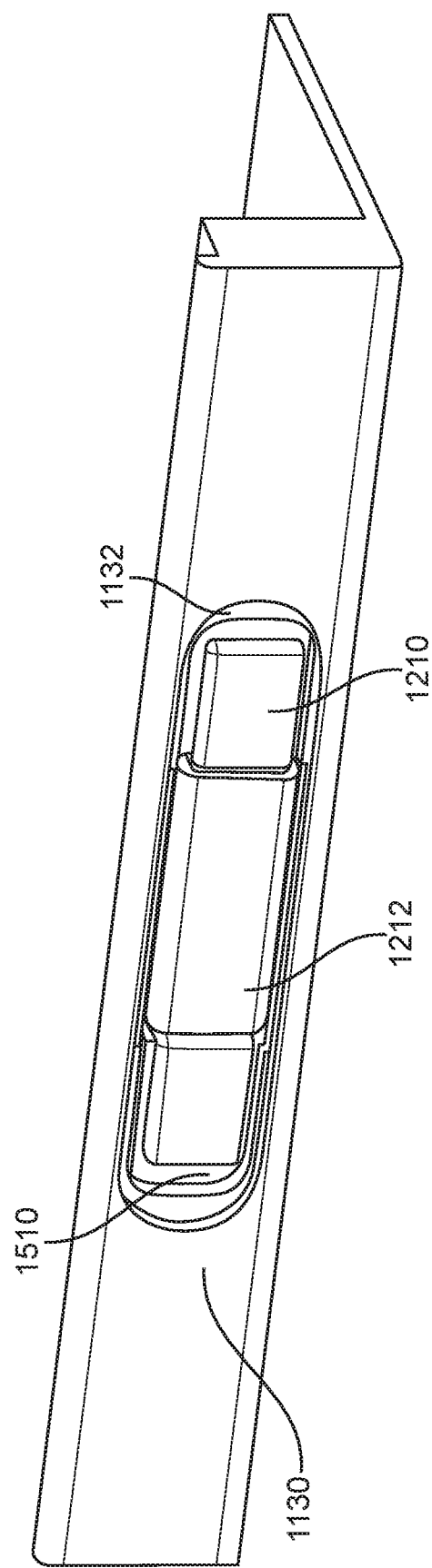
FIG. 15 illustrates a front view of a portion of a hybrid connector according to an embodiment of the present invention.

FIG. 15 illustrates a front view of a portion of a hybrid connector according to an embodiment of the present invention. In this example, window 1120 and contacts 1110 have been removed. Opening 1132 in device enclosure 1130 may include ferrite 1210, which may be partially wrapped in windings 1212. Ferrite 1210 may be held in place by glue, adhesive, or bracket 1510.

Figure 16:
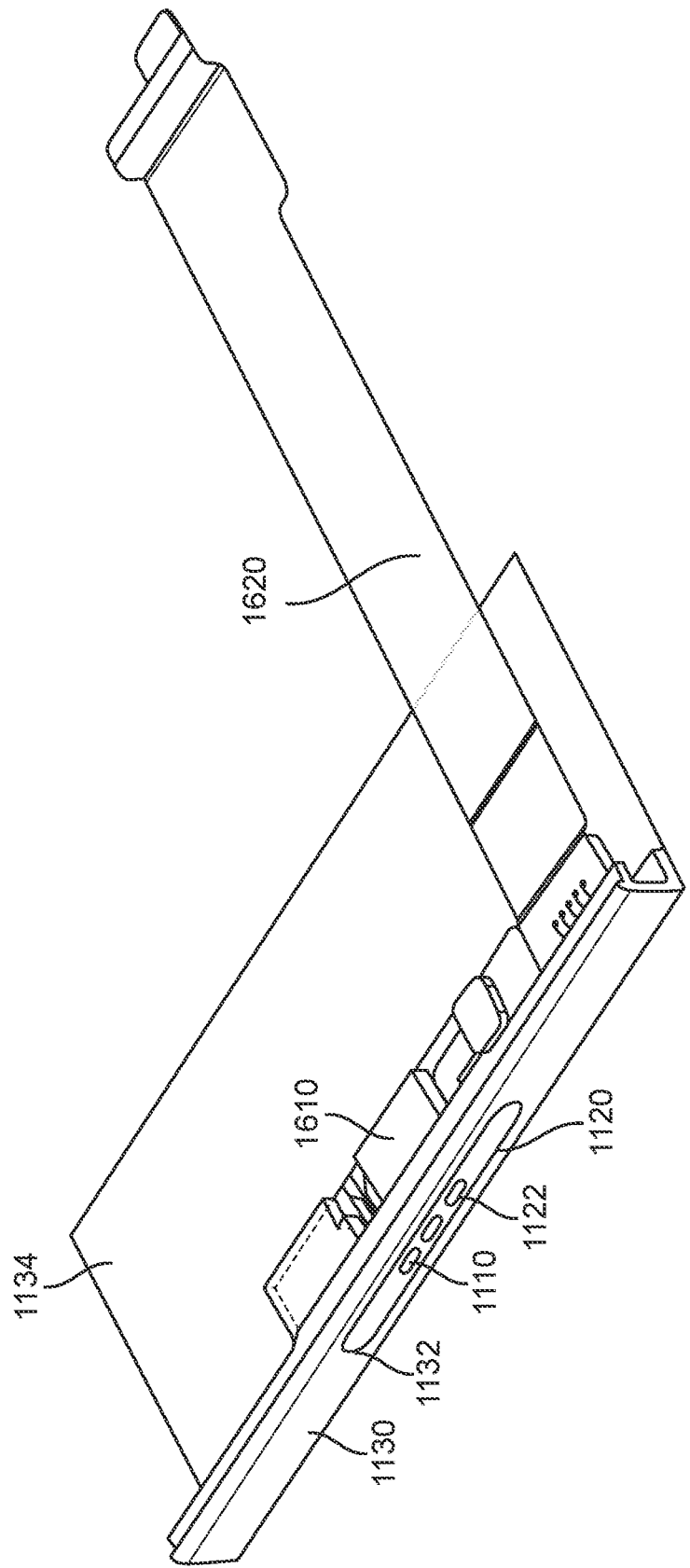
FIG. 16 illustrates a front view of a hybrid connector according to an embodiment of the present invention.

FIG. 16 illustrates a front view of a hybrid connector according to an embodiment of the present invention. As before, window 1120 may be located opening 1132 of device enclosure 1130. Contacts 1110 may be located in openings 1122 in window 1120. Electronic circuitry 1610 may be located on the inside surface 1134 of device enclosure 1130. Electronic circuitry 1610 may include circuitry for receiving and providing power and data over the inductive connector portion of the hybrid connector. Electronic circuitry 1610 may further include circuitry for receiving and providing power and data over contacts 1110 of the wired connector portion of the hybrid connector. Flexible circuit board 1620 may be used to connect electronic circuitry 1610 to other circuitry in the electronic device.

In these and other embodiments of the present invention, electronic circuitry 1610 may be a module or other type of circuitry. For example, electronic circuitry 1610 may be a system-in-package module or other type of module.

Figure 17:
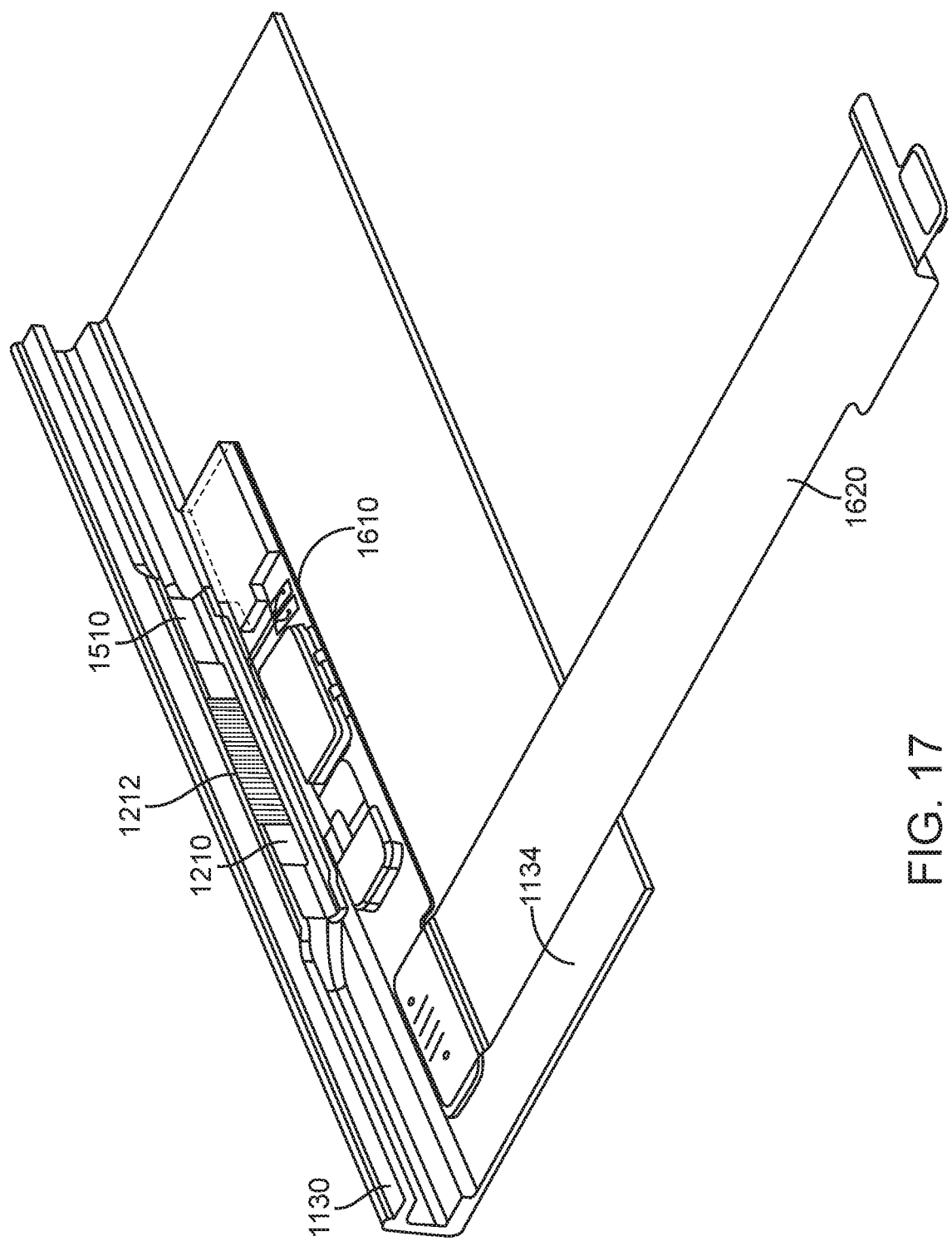
FIG. 17 illustrates a backside of a hybrid connector according to an embodiment of the present invention.

FIG. 17 illustrates a backside of a hybrid connector according to an embodiment of the present invention. In this example, ferrite 1210 may be partially wrapped in windings 1212. Ferrite 1210 may be secured in place in device enclosure 1130 by bracket 1510. Electronic circuitry 1610 may be located on an inside surface 1134 of device enclosure 1130. Flexible circuit board 1620 may connect electronic circuitry 1610 to other circuitry in the electronic device.

The location of contacts 1110 relative to ferrite 1210 and the hybrid connector may cause the inductive connector portion to transfer power and data less efficiently. That is, the location of contacts 1110 may act as a damper or break on a magnetic field generated by ferrite 1210 and windings 1212. Also, cross-talk between the ferrite 1210 and contacts 1110 may be present. That is, when power or data is being sent or received using ferrite 1210 and winding 1212, the power or data signals may interfere with data or power on contacts 1110. Similarly, when power or data is being provided on contacts 1110, those power and data signals may interfere with power or data on ferrite 1210. Even in the situation where data and power are not simultaneously transferred using ferrite 1210 and contacts 1110, such cross-talk may cause other problems, such as falsely detecting a pinging signal used in detecting a connection as described above, mistakenly detecting a start of a data packet or the reception of power, or mistakenly detecting another type of event. Accordingly, embodiments of the present invention may provide contacts to minimize these losses and cross-talk. An example is shown in the following figure.

Figure 18:
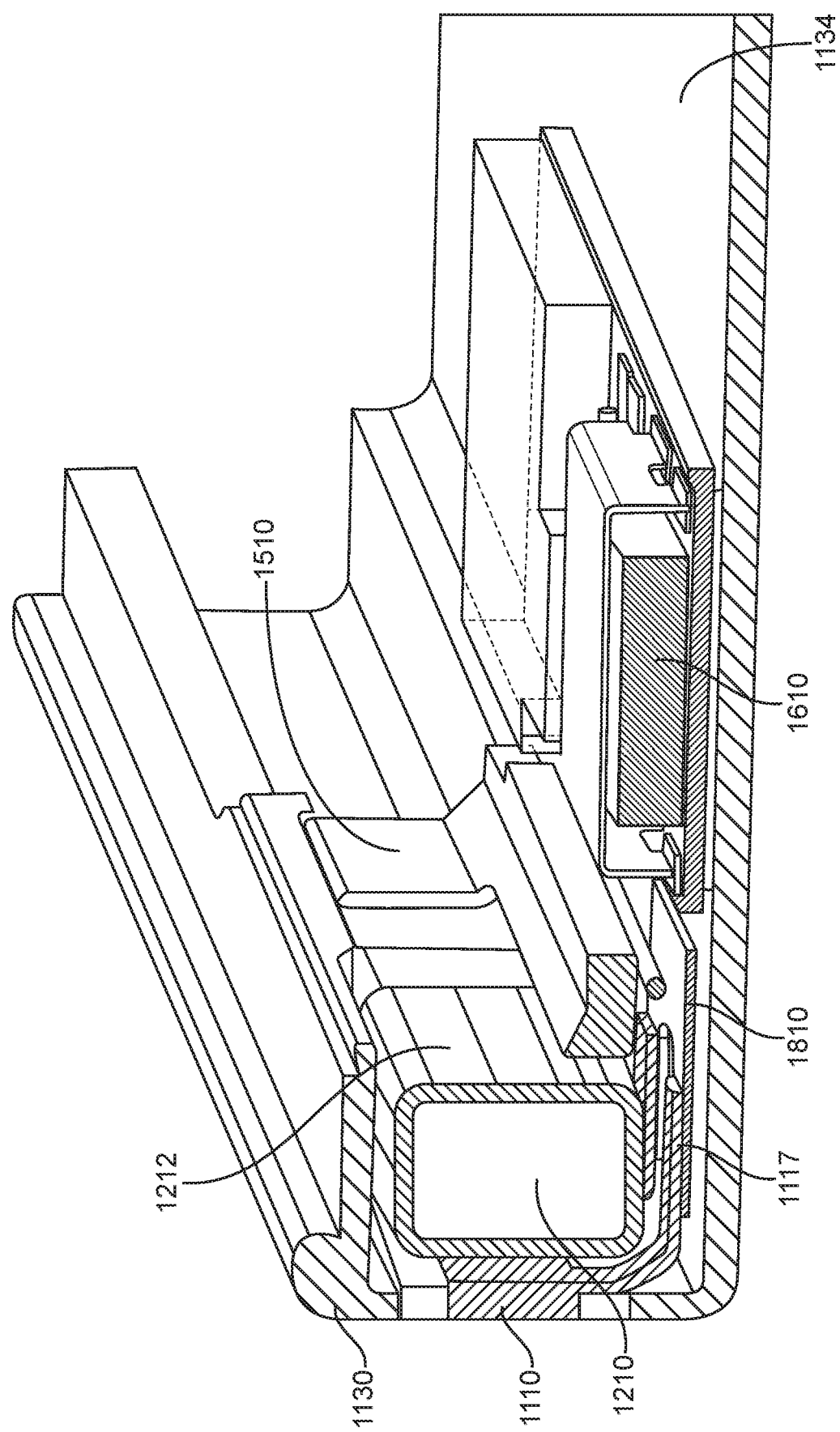
FIG. 18 illustrates a cutaway side view of a portion of an electronic device according to an embodiment of the present invention.

FIG. 18 illustrates a cutaway side view of a portion of an electronic device according to an embodiment of the present invention. In this example, ferrite 1210 may be partially wrapped by windings 1212. Contacts 1110 may be located adjacent to and in front of ferrite 1210. Contacts 1110 may include tail portions 1117 that may extend under ferrite 1210 to contact flexible circuit board 1810. In this way, flexible circuit board 1810 need not be located in front of ferrite 1210 and between ferrite 1210 and contacts 1110. The removal of flexible circuit board 1810 from this area may improve an efficiency of power and data transfer using ferrite 1210 and the inductive connector portion of the hybrid connector. The removal of flexible circuit board 1810 from this area may also increase a spacing between ferrite 1210 and contacts 1110. This additional spacing may help to reduce the cross-talk between signals and power on ferrite 1210 and contacts 1110. Ferrite 1210 may be held in place in device enclosure 1130 by bracket 1510. Electronic circuitry 1610 may be located on the inside surface 1134 of device enclosure 1130.

In various embodiments of the present invention, different portions of these contact assemblies and hybrid connectors may be formed of various materials. For example, housings 220, 520, and 720 may be formed of the same or different materials, such as plastic, LPS, or other non-conductive or conductive material. Contacts 210, 510, 710, and 1110 may be formed of noncorrosive materials, such as gold, gold plated copper, gold plated nickel, gold-nickel alloy, and other materials. Ferrite 1210, ferrite 1310, and other ferrites used in other embodiments of the present invention may be formed of manganese zinc or other appropriate materials.

In various embodiments of the present invention, different portions of these contact assemblies and hybrid connectors may be formed in various ways. For example, housings 220, 520, and 720 may be formed using injection or other molding, printing, or other technique. Contacts 210, 510, 710, and 1110 may be machined, stamped, coined, forged, printed, or formed in different ways, such as by using a deep drawn process. Housings 220, 520, and 720 may be formed around contacts 210, 510, 710, and 1110 using injection molding, or contacts 210, 510, 710, and 1110 may be inserted into housings 220, 520, and 720.

These and other embodiments of the present invention may provide contacts 210, 510, 710, and 1110 that are resistant to corrosion. Contacts 210, 510, 710, 1110, and other contacts according to these and other embodiments of the present invention may include a top plate to match a color of a device enclosure around the contacts. This top plate may be formed of rhodium-ruthenium, dark rhodium, dark ruthenium, gold copper, or other material and may be 0.25 to 1.0 microns, 0.5 to 1.0 microns, 0.5 to 0.85 microns, 0.75 to 0.85 microns thick, or it may have another thickness. At an exposed surface of the contact, a gold plating layer may be below the top plate. On other portions of the contact, the top plate may be omitted and the gold plating layer may be the top layer. This gold plating layer may be between 0.01 to 0.5 microns or between 0.05 and 0.1 microns thick, or it may have another thickness. A leveling layer of nickel-tungsten alloy, tin-nickel, electroless nickel, copper, copper-nickel, silver, or other layer in the range of 1.0, 2.0, 3.0 or 4.0 microns in thickness may be used over a copper or copper alloy contact substrate. An optional barrier level of tin-copper, nickel, palladium, silver, tin-copper-nickel, copper-nickel, tin-nickel, nickel-tungsten, electroless nickel, or other layer may be used above the leveling layer. This barrier layer may have a thickness between 0.15 and 2.0 microns, 1.0 and 1.5 microns, 1.0 and 2.0 microns, or it may have another thickness. An optional tin-copper or other layer may be used between a gold layer and a nickel-tungsten alloy, tin-nickel, electroless nickel, copper, copper-nickel, silver, or other layer in areas where contacts may be soldered to flexible circuit boards. This optional tin-copper or other layer may be between 4, 5, and 6 microns in thickness, for example, between 4 and 6 or between 5 and 6 microns in thickness, though it may have other thicknesses consistent with embodiments of the present invention. Gold or other adhesion layers may be plated between the leveling layer and the barrier layer, and between the barrier layer and the top plate, though either or both of these flash layers may be omitted. These gold layers may be between 0.01 to 0.5 microns or between 0.05 and 0.1 microns thick, or they may have another thickness.

These and other embodiments of the present invention may include a leveling layer of nickel-tungsten alloy, tin-nickel, electroless nickel, copper, copper-nickel, silver, or other material in the range of 1.0, 2.0, 1.0-2.0, 2.0-3.0, 3.0 or 4.0 microns in thickness. A gold flash may be formed on the leveling layer, though this flash may be omitted. A barrier layer of tin-copper, nickel, palladium, silver, tin-copper-nickel, copper-nickel, tin-nickel, nickel-tungsten, electroless nickel, or other material may be used above the leveling layer or gold flash. This layer may have a thickness between 0.15 and 2.0 microns, 1.0 and 1.5 microns, 1.0 and 2.0 microns, or it may have another thickness. A gold flash may be formed on that layer, though this second gold flash may be omitted. This may be followed by a top plate to match a color of a device enclosure around the contacts. This top plate may be formed of rhodium-ruthenium, dark rhodium, dark ruthenium, gold copper, or other material and may be 0.25 to 1.0 microns, 0.5 to 1.0 microns, 0.5 to 0.85 microns, 0.75 to 0.85 microns thick, or it may have another thickness. Other portions of the contacts may have the leveling layer, a thinner barrier layer in the range of one, two, or threes tenth of a micron may be plated over the leveling layer, followed by a gold flash.

In these and other embodiments of the present invention, one or more plating layers may be applied to the surface of the contact substrate for contacts 210, 510, 710, 1110, and other contacts according to these and other embodiments of the present invention. For example, a top plate may be formed over the contact substrate to provide corrosion and scratch protection. This top plate may be formed of rhodium-ruthenium, dark rhodium, dark ruthenium, gold copper, or other material. A barrier layer may be formed over the contact substrate before the top plate is formed to prevent discoloration of the top plate by the contact substrate. The barrier layer may be formed of tin-copper, nickel, palladium, silver, tin-copper-nickel, copper-nickel, tin-nickel, nickel-tungsten, electroless nickel, or other material. One or more adhesion layers may be applied before or after the barrier layer, or both, though either or both of these adhesion layers may be omitted. These adhesion layers may be a gold flash or other layer. Other layers may also be included. For example, a layer of nickel-tungsten alloy, tin-nickel, electroless nickel, copper, copper-nickel, silver, or other material may be plated or formed over the contact substrate before the barrier layer. Other combinations, such as a top plate of rhodium ruthenium over silver, palladium, nickel, electroless nickel, a nickel-tungsten alloy, tin-nickel, tin-copper, tin-copper-nickel, copper-nickel, tin-nickel, nickel-tungsten, or other nickel alloy may be used, where one or more gold layers may be included. Layers of gold over nickel may also be used in these and other embodiments of the present invention. Additional steps, such as electro-polishing or copper plating may be performed on the substrate before further plating. In these and other embodiments of the present invention, these layers and the other layers described herein may be formed by sputtering, vapor deposition, electroplating, or other method. In these and other embodiments of the present invention, the order of these layers may be varied.

In these and other embodiments of the present invention, a leveling layer may be plated over a contact substrate for leveling and adhesion. For example, gold, copper, or other material may act as a leveler and tend to fill vertical differences across a surface of the contact substrate. This may help to cover defects in the contact substrate, such as nodules or nodes that may be left behind by an electropolishing or chemical polishing step. This leveling layer may also provide adhesion between the contact substrate and a barrier layer or top plate. Instead of gold or copper, the leveling layer may be formed of nickel, tin, tin-copper, hard gold, gold-cobalt, or other material, though in other embodiments of the present invention, the leveling layer may be omitted. This leveling layer may have a thickness less than 0.01 micrometers, between 0.01 and 0.05 micrometers, between 0.05 and 0.1 micrometers, between 0.0.5 and 0.15 micrometers, more than 0.1 micrometers, or it may have a thickness in a different range of thicknesses.

In these and other embodiments of the present invention, a top plate may be plated over the leveling layer. The top plate may provide a durable contacting surface for when the contact on the electronic device housing the contact is mated with a corresponding contact on a second electronic device. In various embodiments of the present invention, the top plate may have a Vickers hardness below 100, between 100-200, between 200-300, over 300, or a hardness in another range. The top plate may be formed using rhodium-ruthenium, dark rhodium, dark ruthenium, gold copper, or other materials. The use of rhodium-ruthenium or rhodium may help oxygen formation, which may reduce its corrosion. The percentage of rhodium may be between 85 to 100 percent by weight, for example, it may be 95 or 99 percent by weight, where the most or all of the remaining material is ruthenium. This material may be chosen for its color, wear, hardness, conductivity, scratch resistance, or other property. This top plate may have a thickness less than 0.5 micrometers, between 0.5 and 0.75 micrometers, between 0.75 and 0.85 micrometers, between 0.85 and 1.1 micrometers, more than 1.1 micrometers, or it may have a thickness in a different range of thicknesses.

In these and other embodiments of the present invention, instead of a top plate being plated over the leveling layer, a barrier layer may be plated over the first plating layer and before the top plate. The barrier layer may act as a barrier to prevent color leakage from the contact substrate to the surface of the contact, or the surface of the top plate, and the material used for the barrier layer may be chosen on this basis. In these and other embodiments of the present invention, the barrier layer may be formed using tin-copper, nickel, palladium, silver, tin-copper-nickel, copper-nickel, tin-nickel, nickel-tungsten, electroless nickel, or other material. The use of tin-copper, nickel, palladium, silver, tin-copper-nickel, copper-nickel, tin-nickel, nickel-tungsten, electroless nickel, or other appropriate material may provide a barrier layer that is more positively charged than a top plate of rhodium-ruthenium, dark rhodium, dark ruthenium, gold copper, or other material. This may cause the top plate to act as a sacrificial layer, thereby protecting the underlying barrier layer of nickel, palladium, tin-copper, silver, or other appropriate material. This barrier layer may have a thickness less than 0.1 micrometers, between 0.1 and 0.5 micrometers, between 0.5 and 1.0 micrometers, between 1.0 and 1.5 micrometers, more than 1.0 micrometers, or it may have a thickness in a different range of thicknesses.

In these and other embodiments of the present invention, a first adhesive layer may be plated after the leveling layer and before the barrier layer. The first adhesive layer may provide adhesion. For example, a gold first adhesive layer may provide adhesion between the leveling layer and the barrier layer. For example, a gold first adhesive layer may provide adhesion between a leveling layer of copper, nickel, tin, tin-copper, hard gold, gold-cobalt, or other material and a barrier layer of tin-copper, nickel, palladium, silver, tin-copper-nickel, copper-nickel, tin-nickel, nickel-tungsten, electroless nickel, or other appropriate material. The gold first adhesive layer may be a plated gold strike. Instead of gold, the first adhesive layer may be formed of nickel, copper, tin, tin copper, hard gold, gold cobalt, or other material. This first adhesive layer may have a thickness less than 0.01 micrometers, between 0.01 and 0.05 micrometers, between 0.05 and 0.1 micrometers, between 0.05 and 0.15 micrometers, more than 0.1 micrometers, or it may have a thickness in a different range of thicknesses.

In these and other embodiments of the present invention, the first adhesive layer may be omitted and the barrier layer may be plated directly on the contact substrate (when the leveling layer is also omitted) or the leveling layer.

In these and other embodiments of the present invention, a second adhesive layer may be plated over the barrier layer. The second adhesive layer may, like the first adhesive and the leveling layer, provide leveling and adhesion. For example, gold may tend to fill vertical differences across a surface of the barrier layer and may provide adhesion between the barrier layer and a top plate. For example, a gold second adhesive layer may provide adhesion between a barrier layer of tin-copper, nickel, palladium, silver, tin-copper-nickel, copper-nickel, tin-nickel, nickel-tungsten, electroless nickel, or other material and a top plate of rhodium-ruthenium, dark rhodium, dark ruthenium, gold copper, or other material. The gold second adhesive layer may be a plated gold strike. Instead of gold, the second adhesive layer may be formed of nickel, copper, tin, tin copper, hard gold, gold cobalt, or other material. This second adhesive layer may have a thickness less than 0.01 micrometers, between 0.01 and 0.05 micrometers, between 0.05 and 0.1 micrometers, between 0.05 and 0.15 micrometers, more than 0.1 micrometers, or it may have a thickness in a different range of thicknesses.

In these and other embodiments of the present invention, the second adhesive layer may be omitted and the top plate may be plated directly on the barrier layer. In these and other embodiments of the present invention, the top plate described above may be plated over the second adhesive layer.

These and other embodiments of the present invention may provide contact assemblies and hybrid connectors that may be located in various types of devices, such as portable computing devices, tablet computers, desktop computers, laptops, all-in-one computers, wearable computing devices, cell phones, smart phones, media phones, storage devices, keyboards, covers, cases, portable media players, navigation systems, monitors, power supplies, adapters, remote control devices, chargers, and other devices. These devices may include contact assemblies and hybrid connectors that may provide pathways for signals and power compliant with various standards such as one of the Universal Serial Bus (USB) standards including USB Type-C, HDMI, DVI, Ethernet, DisplayPort, Thunderbolt, Lightning, JTAG, TAP, DART, UARTs, clock signals, power signals, and other types of standard, non-standard, and proprietary interfaces and combinations thereof that have been developed, are being developed, or will be developed in the future. In one example, a contact assembly or hybrid connector may be used to convey a data signal, a power supply, and ground. In this example, the data signal may be unidirectional or bidirectional and the power supply may be unidirectional or bidirectional.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. An electronic device comprising:
a device enclosure;
an opening in the device enclosure;
a window in the opening in the device enclosure;
a plurality of contacts, each in a corresponding one of a plurality of openings in the window; and
a ferrite aligned with the window and positioned such that the plurality of contacts are between the ferrite and the window, wherein the ferrite is partially wrapped with a winding.

2. The electronic device of claim 1 wherein the window is a plastic window.

3. The electronic device of claim 1 wherein the window is formed of sapphire.

4. The electronic device of claim 1 further comprising electronic circuitry coupled to the plurality of contacts and the winding.

5. The electronic device of claim 4 wherein the electronic circuitry forms a system-in-package module.

6. The electronic device of claim 4 wherein the electronic circuitry provides power to a second electronic device using the plurality of contacts.

7. The electronic device of claim 6 wherein the electronic circuitry communicates with the second electronic device using the plurality of contacts.

8. The electronic device of claim 7 wherein the electronic circuitry provides power to a third electronic device using the winding around the ferrite.

9. The electronic device of claim 8 wherein the electronic circuitry communicates with the third electronic device using the winding around the ferrite.

10. An electronic device comprising:
a device enclosure;
an opening in the device enclosure;
a ferrite aligned with the opening in the device enclosure;
a winding around at least a portion of the ferrite;
a plurality of contacts aligned with the opening in the device enclosure, each of the plurality of contacts between the opening and the ferrite, each of the plurality of contacts having a tail extending under the ferrite; and
a flexible circuit board extending under the ferrite and contacting the tail of each of the plurality of contacts.

11. The electronic device of claim 10 wherein the tail of each of the plurality of contacts forms a right-angle.

12. The electronic device of claim 10 wherein the flexible circuit board does not extend between the plurality of contacts and the ferrite.

13. The electronic device of claim 10 further comprising a window in the opening in the device enclosure.

14. The electronic device of claim 13 wherein the window is a plastic window.

15. The electronic device of claim 13 wherein the window is formed of sapphire.

16. The electronic device of claim 13 further comprising electronic circuitry coupled to the plurality of contacts and the winding.

17. The electronic device of claim 16 wherein the electronic circuitry forms a system-in-package module.

18. A contact assembly comprising:
a plurality of contacts, each having a contacting surface for mating with a corresponding contact on a corresponding connector and a contacting portion for mating to a flexible circuit board; and
a housing supporting the plurality of contacts, a front side of the housing including a raised portion around the plurality of contacts and a plurality of insulating rings, each around a corresponding one of the plurality of contacts, where a contacting surface of each of the plurality of contacts is exposed at the front side of the housing and a contacting portion of each of the plurality of contacts is exposed at a backside of the housing,
wherein the contacting surface of each of the plurality of contacts is substantially flush with a surface of a corresponding insulating ring, and
wherein the backside of the housing comprises a plurality of alignment features and is otherwise substantially flat such that the backside of the housing is configured to be covered with the flexible circuit board.

19. The contact assembly of claim 18 wherein the alignment features comprise a plurality of posts to be inserted into openings in the flexible circuit board.

20. The contact assembly of claim 18 wherein for each contact in the plurality of contacts, the contacting surface and the contacting portion are on opposite sides of the contact.

* * * * *